(12) United States Patent
Ho et al.

(10) Patent No.: US 10,903,516 B2
(45) Date of Patent: Jan. 26, 2021

(54) METHOD OF PREPARING CATHODE MATERIAL FOR SECONDARY BATTERY

(71) Applicant: GRST International Limited, Hong Kong (HK)

(72) Inventors: Kam Piu Ho, Hong Kong (HK); Ranshi Wang, Hong Kong (HK); Peihua Shen, Guangdong (CN); Yingkai Jiang, Hong Kong (HK)

(73) Assignee: GRST International Limited, Hong Kong (HK)

( * ) Notice: Subject to any disclaimer, the term of this patent is extended or adjusted under 35 U.S.C. 154(b) by 193 days.

(21) Appl. No.: 16/313,978

(22) PCT Filed: Dec. 8, 2017

(86) PCT No.: PCT/CN2017/115346
§ 371 (c)(1),
(2) Date: Dec. 28, 2018

(87) PCT Pub. No.: WO2018/113541
PCT Pub. Date: Jun. 28, 2018

(65) Prior Publication Data
US 2020/0185760 A1    Jun. 11, 2020

Related U.S. Application Data

(60) Provisional application No. 62/435,863, filed on Dec. 19, 2016.

(51) Int. Cl.
| | | |
|---|---|---|
| *H01M 10/00* | (2006.01) | |
| *H01M 10/0525* | (2010.01) | |
| *H01M 4/36* | (2006.01) | |
| *H01M 4/485* | (2010.01) | |
| *H01M 4/505* | (2010.01) | |
| *H01M 4/525* | (2010.01) | |

(52) U.S. Cl.
CPC ....... *H01M 10/0525* (2013.01); *H01M 4/364* (2013.01); *H01M 4/485* (2013.01); *H01M 4/505* (2013.01); *H01M 4/525* (2013.01)

(58) Field of Classification Search
CPC .. H01M 10/0525; H01M 4/364; H01M 4/485; H01M 4/505; H01M 4/525; H01M 4/1391; C01G 45/1228; C01G 45/1257; C01G 51/50; C01G 51/56; C01G 53/50; C01G 53/56
See application file for complete search history.

(56) References Cited

U.S. PATENT DOCUMENTS

| | | | | |
|---|---|---|---|---|
| 2009/0302283 A1* | 12/2009 | Xia | ........................ | C01G 53/04 252/519.14 |
| 2016/0036043 A1 | 2/2016 | Dai et al. | | |
| 2016/0254540 A1 | 9/2016 | Lee et al. | | |

FOREIGN PATENT DOCUMENTS

| | | |
|---|---|---|
| CN | 1641913 A | 7/2005 |
| CN | 101597089 A | 12/2009 |
| CN | 100583512 C | 1/2010 |
| CN | 101229928 B | 4/2010 |
| CN | 102903897 A | 1/2013 |
| CN | 103178257 A | 6/2013 |
| CN | 103904318 A | 7/2014 |

OTHER PUBLICATIONS

International Search Report of PCT Patent Application No. PCT/CN2017/115346 dated Feb. 22, 2018.
Search Report of Counterpart European Patent Application No. 17882989 dated Jun. 30, 2020.

* cited by examiner

*Primary Examiner* — Steven J Bos

(57) ABSTRACT

Provided herein is a method for preparing a ternary cathode material for lithium-ion battery by a static mixer, wherein the cathode material comprises a lithium multi-metal composite oxide represented by $xLi_2MnO_3 \cdot (1-x) LiNi_aMn_bCo_cAl_{(1-a-b-c)}O_2$, where $0 \leq a < 1$, $0 \leq b < 1$, $0 \leq c < 1$, $a+b+c \leq 1$, and $0 \leq x < 1$. The cathode material disclosed herein exhibits a high initial specific capacity, possesses good safety characteristics and shows excellent capacity retention.

20 Claims, 1 Drawing Sheet

METHOD OF PREPARING CATHODE MATERIAL FOR SECONDARY BATTERY

FIELD OF THE INVENTION

The present invention relates to the field of batteries. In particular, this invention relates to methods for preparing cathode material for lithium-ion batteries.

BACKGROUND OF THE INVENTION

In the past decades, lithium-ion batteries (LIBs) have been widely utilized in various applications especially consumer electronics because of their superior energy density, long cycle life and discharging capability. LIBs generally include an anode, an electrolyte, and a cathode that contains lithium in the form of a lithium-transition metal oxide, such as $LiCoO_2$, $LiNiO_2$ and $LiMn_2O_4$.

Currently, LIBs mostly utilize metal oxides as cathode material with $LiCoO_2$ as the most popular and commercially successful representative. However, due to the intrinsic material properties of this cathode material, besides the toxicity and high material cost of cobalt, further enhancement of performance of LIBs is also limited $LiNiO_2$ is characterized for its high specific capacity up to 180 mAh/g. But its application is limited to experimental research because of difficulties in synthesis and safety concerns due to thermal runaway reaction. $LiMn_2O_4$ has been considered as a promising cathode material due to its advantages of high stability and low cost. However, its low charge capacity and inferior cycling performance, especially under high temperatures, limit the application of this material.

In recent years, a multi-element lithium transition metal oxide such as lithium nickel manganese cobalt oxide (NMC) and lithium nickel cobalt aluminium oxide (NCA) has been proposed to replace $LiCoO_2$. This multi-element transition metal oxide as cathode material is expected to leverage merits of each component material and might even prevail in the overall performance, because of the synergy effect of the three transition metal ions and the flexibility of composition. Therefore, $LiCoO_2$ is gradually replaced by the ternary transition metal oxides especially in applications that require high energy density.

The composite transition metal compound may be prepared by mixing transition metal-containing salts in a desired molar ratio with a base in an aqueous solution and simultaneously precipitating two or more types of transition metal elements in the aqueous solution. The coprecipitation method requires stringent control of the operating conditions such as pH, temperature and ion concentration. Variations of these conditions may affect the average particle diameter, particle diameter distribution, particle density and composition of the transition metal cathode material precursor, thereby resulting in poor electrochemical performance of the LIBs.

CN Patent Application No. 102903897 A discloses a preparation method of a spinel lithium nickel manganese oxide ($LiNi_{0.5}Mn_{1.5}O_4$) cathode material using a static mixer. The method comprises mixing a cobalt salt solution and a manganese salt solution to obtain solution A; mixing a carbonate solution and an ammonia solution to obtain solution B; pumping solution A and solution B into a static mixer at the same volumetric flow rate to obtain a suspension; aging the suspension for 1 hour to 4 hours; performing washing to obtain a slurry; spray-drying the slurry to obtain a nickel manganese composite carbonate precursor; calcining the precursor at 400° C. to 500° C. for 5 hours to 10 hours to obtain a nickel manganese composite oxide; mixing the composite oxide with lithium salt by a ball mill; calcining the mixture at 800° C. to 950° C. However, this method is not suitable for preparing ternary composite oxide and is only limited to preparing spinel lithium nickel manganese oxide.

CN Patent No. 101229928 B discloses a method for preparing a lithium nickel manganese cobalt oxide cathode material. The method comprises preparing a mixed aqueous solution of a nickel salt, cobalt salt and manganese salt in a molar ratio of 1:1:1; preparing a carbonate aqueous solution; preparing an ammonium aqueous solution; pumping the three solutions into a stirred reactor and controlling the pH value in a range between 7.9 and 8.5 to form a precursor; separating, washing and drying the precursor to obtain composite carbonate of nickel, manganese and cobalt; calcining the composite carbonate from 480° C. to 550° C. for 4 hours to 6 hours; ball milling a mixture of lithium salt and water for 3 hours to 4 hours to prepare a lithium salt slurry; mixing the lithium salt slurry with the heat-treated precursor to obtain a mixture; calcining the mixture to obtain the cathode material. However, conventional mixing in a stirred reactor may lead to incomplete mixing of reactants because of imperfect macro-mixing. When a reaction product is precipitated during co-precipitation, imperfect mixing may have serious consequences, leading to agglomeration, formation of composite precursor having a wide range of different particle sizes, and formation of unwanted composite precursors.

CN Patent Application No. 103178257 A discloses a method for preparing an NMC cathode material precursor for lithium-ion batteries. The method comprises dissolving a nickel salt, a cobalt salt and a manganese salt in deionized water to obtain a metal salt solution; preparing an aqueous alkaline solution; mixing the two solutions and controlling the pH value in a range from 8 to 11 to obtain a mixture; stirring the mixture for over 60 hours; leaving the mixture to stand for 2 hours to 4 hours; filtering and obtaining a solid; washing and drying the solid to obtain the cathode precursor. However, the method is time-consuming as a very long time is required for the co-precipitation process. In addition, the method does not provide sufficient data for evaluating the electrochemical performance of the cathode material.

CN Patent No. 100583512 C discloses a method for preparing an NCA cathode material. The method comprises preparing a mixed metal salt solution of a nickel salt, a cobalt salt and an aluminium salt in a molar ratio of 80:15:5; preparing an alkaline solution comprising sodium hydroxide and a complexing agent; pumping the two solutions into a reactor containing a carbonate solution and controlling the pH value in a range between 9 and 13; stirring the solution for 20 hours to 30 hours to obtain a cathode precursor; filtering, washing and drying the precursor; mixing the precursor with a lithium source to obtain a mixture; calcining the mixture at a temperature between 700° C. and 900° C. for 20 hours to 30 hours to obtain the cathode material. However, the method is also time-consuming since a very long time is required for the whole process. In addition, conventional mixing in a stirred reactor may lead to incomplete mixing of reactants because of imperfect macro-mixing.

In view of the above, there is always a need to develop a method for preparing a ternary transition metal oxide as a cathode material for lithium-ion batteries with good electrochemical performance with a simple and fast method.

SUMMARY OF THE INVENTION

The aforementioned needs are met by various aspects and embodiments disclosed herein.

In one aspect, provided herein is a method of preparing a cathode material, comprising the steps of:
1) dissolving a combination of at least three of a salt of nickel, a salt of manganese, a salt of cobalt, and a salt of aluminium in water to obtain a first solution, wherein a total molar concentration of the metal elements in the first solution is from about 0.1 mol/L to about 3 mol/L;
2) dissolving a precipitating agent in water to form a second solution, wherein a concentration of the precipitating agent in the second solution is from about 0.5 mol/L to about 6 mol/L;
3) pre-heating the first solution and the second solution to the same temperature from about 30° C. to about 80° C. to obtain a pre-heated first solution and a pre-heated second solution respectively;
4) feeding the pre-heated first solution and the pre-heated second solution to a first inlet and a second inlet of a static mixer respectively to obtain a co-precipitating solution;
5) filtering a suspension eluted from an outlet of the static mixer to obtain a cathode material precursor, wherein the outlet of the static mixer is coupled to a pH controller for controlling the flow rate of the pre-heated first and second solutions;
6) washing the cathode material precursor with water;
7) drying the cathode material precursor at a temperature from about 60° C. to about 105° C. for a time period from about 4 hours to about 24 hours to obtain a dried cathode material precursor;
8) mixing the dried cathode material precursor with one or more lithium salts to obtain a solid mixture, wherein a molar ratio of the metal element lithium of the one or more lithium salts to the total amount of the metal elements selected from a combination of at least three of nickel, manganese, cobalt, and aluminium is from about 1.5:1 to about 1:1, or from about 1.03:1 to about 1:1; and
9) calcining the solid mixture in two stages to obtain the cathode material, wherein the first stage is conducted at a temperature from about 350° C. to about 550° C. for a time period from about 2 hours to about 10 hours, and the second stage is conducted at a temperature from about 750° C. to about 950° C. for a time period from about 6 hours to about 15 hours, and wherein the cathode material comprises a lithium multi-metal composite oxide represented by $xLi_2MnO_3 \cdot (1-x)LiNi_aMn_bCo_cAl_{(1-a-b-c)}O_2$, wherein $0 \leq a < 1$, $0 \leq b < 1$, $0 \leq c < 1$, $a+b+c \leq 1$, and $0 \leq x < 1$; and the cathode material has a D90/D10 ratio from about 1.4 to about 1.9.

In some embodiments, each of the salt of nickel, the salt of manganese, the salt of cobalt, and the salt of the aluminium independently comprise an anion selected from the group consisting of sulfate, nitrate, acetate, chloride, and combinations thereof. In certain embodiments, the salt of the aluminium is sodium aluminate.

In certain embodiments, the precipitating agent is selected from the group consisting of sodium hydroxide, potassium hydroxide, calcium hydroxide, ammonium hydroxide, sodium carbonate, potassium carbonate, sodium hydrogencarbonate, potassium hydrogencarbonate, calcium hydrogencarbonate, ammonium carbonate, and combinations thereof. In some embodiments, the method does not comprise a step of adding ammonia solution to the pre-heated second solution or the co-precipitating solution.

In some embodiments, the static mixer has a length from about 30 cm to about 100 cm and a diameter from about 5 mm to about 20 cm. In certain embodiments, the ratio of the length of the static mixer to the diameter of the static mixer is from about 2:1 to about 20:1. In some embodiments, the static mixer is made of plastic selected from the group consisting of polypropylene, polytetrafluoroethylene, polyvinyl chloride, copolymers thereof, and combinations thereof.

In certain embodiments, the static mixer is coupled to a heating element, and wherein the heating element is a heating jacket surrounding at least a portion of the length of the static mixer. In some embodiments, the temperature of the heating jacket and the pre-heated first and second solutions are the same.

In some embodiments, the static mixer is sonicated by an ultrasonicator. In certain embodiments, the ultrasonicator is operated at a power from about 60 W to about 600 W.

In certain embodiments, the pH value of the co-precipitating solution in the static mixer is maintained at a range from about 8 to about 12. In some embodiments, the co-precipitating solution is mixed in the static mixer for a time period less than 2 minutes. In certain embodiments, the suspension is washed with water for a time period from about 30 minutes to about 2 hours.

In some embodiments, the cathode material precursor is $[Ni_aMn_bCo_cAl_{(1-a-b-c)}](OH)_2$ or $[Ni_aMn_bCo_cAl_{(1-a-b-c)}]CO_3$, wherein $0 \leq a < 1$, $0 \leq c < 1$, and $a+b+c \leq 1$. In certain embodiments, the cathode material precursor is selected from the group consisting of $[Ni_{0.33}Mn_{0.33}Co_{0.33}](OH)_2$, $[Ni_{0.4}Mn_{0.4}Co_{0.2}](OH)_2$, $[Ni_{0.5}Mn_{0.3}Co_{0.2}](OH)_2$, $[Ni_{0.6}Mn_{0.2}Co_{0.2}](OH)_2$, $[Ni_{0.7}Mn_{0.15}Co_{0.15}](OH)_2$, $[Ni_{0.8}Mn_{0.1}Co_{0.1}](OH)_2$, $[Ni_{0.92}Mn_{0.04}Co_{0.04}](OH)_2$, $[Ni_{0.8}Mn_{0.15}Al_{0.05}](OH)_2$, $[Ni_{0.33}Mn_{0.33}Co_{0.33}](OH)_3$, $[Ni_{0.4}Mn_{0.4}Co_{0.2}]CO_3$, $[Ni_{0.5}Mn_{0.3}Co_{0.2}]CO_3$, $[Ni_{0.06}Mno_{0.2}C_{00.2}]CO_3$, $[Ni_{0.7}Mn_{0.15}Co_{0.15}]CO_3$, $[Ni_{0.8}Mn_{0.1}Co_{0.1}]CO_3$, $[Ni_{0.92}Mn_{0.04}Co_{0.04}]CO_3$, and $[Ni_{0.8}Co_{0.15}Al_{0.05}]CO_3$. In some embodiments, the dried cathode material precursor has a particle size D50 in the range from about 1 μm to about 12 μm. In certain embodiments, the dried cathode material precursor has a D90/D10 ratio from about 1.3 to about 2.

In certain embodiments, the dried cathode material precursor and the one or more lithium salts are mixed for a time period from about 30 minutes to about 2 hours. In some embodiments, the lithium salt is selected from the group consisting of lithium hydroxide, lithium carbonate, lithium fluoride, lithium acetate, lithium oxalate, and combinations thereof.

DETAILED DESCRIPTION OF THE INVENTION

Figure 1:
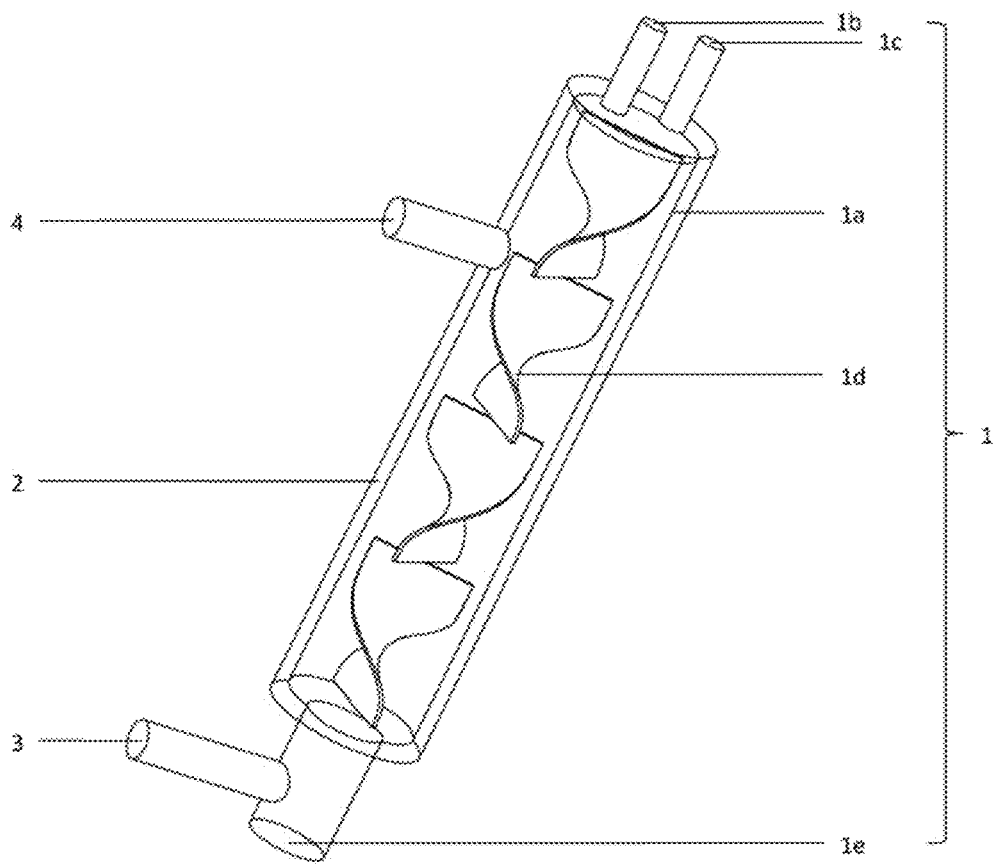
FIG. 1 depicts an embodiment of an apparatus comprising a static mixer used in the method disclosed herein.

Provided herein is a method of preparing a cathode material for a lithium-ion battery cell, comprising the steps of:
1) dissolving a combination of at least three of a salt of nickel, a salt of manganese, a salt of cobalt, and a salt of aluminium in water to obtain a first solution, wherein a total molar concentration of the metal elements in the first solution is from about 0.1 mol/L to about 3 mol/L;

2) dissolving a precipitating agent in water to form a second solution, wherein a concentration of the precipitating agent in the second solution is from about 0.5 mol/L to about 6 mol/L;
3) pre-heating the first solution and the second solution to the same temperature from about 30° C. to about 80° C. to obtain a pre-heated first solution and a pre-heated second solution respectively;
4) feeding the pre-heated first solution and the pre-heated second solution to a first inlet and a second inlet of a static mixer respectively to obtain a co-precipitating solution;
5) filtering a suspension eluted from an outlet of the static mixer to obtain a cathode material precursor, wherein the outlet of the static mixer is coupled to a pH controller for controlling the flow rate of the pre-heated first and second solutions;
6) washing the cathode material precursor with water;
7) drying the cathode material precursor at a temperature from about 60° C. to about 105° C. for a time period from about 4 hours to about 24 hours to obtain a dried cathode material precursor;
8) mixing the dried cathode material precursor with one or more lithium salts to obtain a solid mixture, wherein a molar ratio of the metal element lithium of the one or more lithium salts to the total amount of the metal elements selected from a combination of at least three of nickel, manganese, cobalt, and aluminium is from about 1.5:1 to about 1:1, or from about 1.03:1 to about 1:1; and
9) calcining the solid mixture in two stages to obtain the cathode material, wherein the first stage is conducted at a temperature from about 350° C. to about 550° C. for a time period from about 2 hours to about 10 hours, and the second stage is conducted at a temperature from about 750° C. to about 950° C. for a time period from about 6 hours to about 15 hours, and wherein the cathode material comprises a lithium multi-metal composite oxide represented by $xLi_2MnO_3 \cdot (1-x)LiNi_aMn_bCo_cAl_{(1-a-b-c)}O_2$, wherein $0 \leq a < 1$, $0 \leq b < 1$, $0 \leq c < 1$, $a+b+c \leq 1$, and $0 \leq x < 1$; and the cathode material has a D90/D10 ratio from about 1.4 to about 1.9.

The term "ternary cathode material" refers to a lithium multi-metal composite oxide comprising lithium and three metal elements different from lithium. Some non-limiting examples of the ternary cathode material include lithium nickel manganese cobalt oxide and lithium nickel cobalt aluminium oxide.

The term "precipitating agent" refers to a base used in a precipitating reaction for forming an insoluble solid (precipitate) by exchanging soluble ion materials. The pH at which a precipitate is formed depends on the composition of the precipitate. In some embodiments, the pH is greater than 7.0, greater than 7.5, greater than 8.0, greater than 9.0, greater than 10.0, greater than 11.0, or greater than 12.0. In other embodiments, the pH is less than 12.0, less than 11.0, less than 10.0, less than 9.0, or less than 8.0.

The term "base" includes any molecule or ion that can accept protons from any proton donor, acid/or contain completely or partially displaceable $OH^-$ ions. Some non-limiting examples of suitable bases include alkali metal hydroxides (e.g., NaOH, LiOH and KOH), alkaline earth metal hydroxides (e.g., $Ca(OH)_2$), an ammonia solution (e.g., $NH_4OH$), alkali metal carbonates (e.g., $Na_2CO_3$ and $K_2CO_3$), alkali metal hydrogen carbonates (e.g., $NaHCO_3$ and $KHCO_3$), organic base (e.g., $(CH_3)_4NOH$ and polyethylene glycol) and mixtures thereof.

The term "complexing agent" refers to a molecule that is chemically bonded to a metal coordination centre to form a coordination complex.

The term "static mixer" refers to an apparatus comprising a conduit or tube and a number of stationary or static mixing elements arranged in a series within a conduit or pipe that mixes or blends materials flowing through the conduit by repetitively combining, dividing and recombining the flow many times. The number of static mixing elements can range from 4 to 32 or more depending upon the degree of mixing required and characteristics of materials being mixed.

The term "element" refers to a plate inserted in the conduit that interrupts and divides and recombines the fluid flow.

The term "heating jacket" refers to a cylindrical jacket adapted to be placed around an article to be heated.

The term "calcining" refers to a heat treatment process whereby a material or a mixture of materials is heated to a high temperature at which heat-induced physical or chemical change takes place.

The term "average particle size D50" refers to a volume-based accumulative 50% size (D50) which is a particle size at a point of 50% on an accumulative curve when the accumulative curve is drawn so that a particle size distribution is obtained on the volume basis and the whole volume is 100%. Further, with respect to the cathode material precursor and lithium-containing composite oxide of the present invention, the average particle size D50 means a volume-averaged particle size of secondary particles which are founded by mutual agglomeration and sintering of primary particles, and in a case where the particles are composed of the primary particles only, it means a volume-averaged particle size of the primary particles. Furthermore, D10 means a volume-based accumulative 10% size, and D90 means a volume-based accumulative 90% size.

The term "tapped density" refers to the bulk density of the powder or granules after a compaction process, i.e. density at constant volume. For example, a vessel containing a loose powdered sample is mechanically tapped on its surface to compact the sample to constant volume.

The term "homogenizer" refers to an equipment that can be used for homogenization of materials. Any conventional homogenizers can be used for the method disclosed herein. Some non-limiting examples of the homogenizer include stirring mixers, blenders, mills (e.g., colloid mills and sand mills), ultrasonicators, atomizers, rotor-stator homogenizers, and high pressure homogenizers.

The term "ultrasonicator" refers to an equipment that can apply ultrasound energy to agitate particles in a sample. Any ultrasonicator that can be coupled to a static mixer can used herein.

The term "planetary mixer" refers to an equipment that can be used to mix or stir different materials, which consists of blades conducting a planetary motion within a vessel. In some embodiments, the planetary mixer comprises at least one planetary blade and at least one high speed dispersion blade. The planetary and the high speed dispersion blades rotate on their own axes and also rotate continuously around the vessel. The rotation speed can be expressed in unit of rotations per minute (rpm) which refers to the number of rotations that a rotating body completes in one minute.

The term "furnace" refers to a device used for high-temperature heating.

The term "overs" refers to oversized particles that cannot pass through the screen.

The term "unders" refers to particles having a mesh size smaller than the mesh size of a mesh sieve.

The term "current collector" refers to a support for coating the active battery electrode material and a chemically inactive high electron conductor for keeping an electric current flowing to electrodes during discharging or charging a secondary battery.

The term "electrode" refers to a "cathode" or an "anode."

The term "positive electrode" is used interchangeably with cathode. Likewise, the term "negative electrode" is used interchangeably with anode.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/− 1° C. or +/− 2° C. or +/− 3 CC. In other embodiments, room temperature refers to a temperature of about 22° C. or about 25° C.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or the full energy in 10 hours; and a 5 C means utilization of the full energy in 12 minutes.

The term "battery cycle life" refers to the number of complete charge/discharge cycles a battery can perform before its nominal capacity falls below 80% of its initial rated capacity.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3,600 coulombs of electrical charge. Similarly, the term "miniampere-hour (mAh)" also refers to a unit of the storage capacity of a battery and is $1/1,000$ of an ampere-hour.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed, in particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

FIG. 1 shows an embodiment of the apparatus comprising a static mixer for preparing a cathode material precursor according to the present invention. The apparatus disclosed herein comprises a static mixer 1 having a hollow housing 1a, a first inlet opening 1b through which the pre-heated first solution is introduced into the static mixer 1 for being mixed there, a second inlet opening 1c through which the pre-heated second solution is introduced into the static mixer 1 for being mixed there, a plurality of mixing elements 1d which are arranged in the static mixer 1, and an outlet opening 1e for discharging the suspension. The static mixer 1 is coupled to a heating jacket 2, a pH controller 3 for controlling the pH of the co-precipitating (CoP) solution; and an ultrasonicator 4.

The conventional method of manufacturing multi-element cathode material precursor comprises reacting an alkaline aqueous solution, such as sodium hydroxide, with an aqueous solution of metal salts to precipitate composite metal hydroxide in a stirring tank. After the growth of the crystal by aging the precipitate, the metal hydroxide crystal is filtered. However, poor mixing may result in formation of dead zones or stagnant region. This effect always occurs in heterogeneous systems (e.g. suspensions and emulsions). In an incompletely mixed state, local concentration differences exist. Therefore, there is no guarantee that uniformity of composition of the precipitate is achieved. Furthermore, the co-precipitation method with stirring condition usually requires a long mixing time to fully precipitate and the particles thus formed may agglomerate. This may lead to the formation of composite metal hydroxide powder having non-uniform particle size distribution, thereby making it difficult to provide an electrode of high packing density.

The method disclosed herein comprises mixing a mixed nickel/manganese/cobalt salt solution or a mixed nickel/cobalt/aluminium salt solution with a solution having a dissolved precipitating agent in a static mixer to prepare a ternary cathode material precursor. The two solutions are fed into the static mixer continuously and mixed together by the static mixing elements as the fluid stream passes over each mixing element. Static mixers can provide uniform mixing in a relatively short period of time.

The invention is particularly suitable for preparing ternary composite and cathode materials with high nickel content. In some embodiments, the ternary composite is a lithium multi-metal composite oxide represented by $xLi_2MnO_3 \cdot (1-x)LiNi_aMn_bCo_cAl_{(1-a-b-c)}O_2$, wherein $0 \leq a<1$, $0 \leq b<1$, $0 \leq c<1$, $a+b+c \leq 1$ and $0 \leq x<1$. In certain embodiments, the ternary composite is a $LiNi_{0.33}Mn_{0.33}Co_{0.33}O_2$ (NMC333), $LiNi_{0.4}Mn_{0.4}Co_{0.2}O_2$, $LiNi_{0.5}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.8}Mn_{0.1}Co_{0.1}O_2$ (NMC811), $LiNi_{0.92}Mn_{0.4}Co_{0.04}O_2$, $LiNi_{0.8}Co_{0.15}Al_{0.15}O_2$ (NCA), $0.4Li_2MnO_3 \cdot 0.6LiNi_{0.33}Mn_{0.33}Co_{0.33}O_2$, $0.3Li_2MnO_3 \cdot 0.7LiNi_{0.33}Mn_{0.33}Co_{0.33}O_2$, or $0.1.6Li_2MnO_3 \cdot 0.84LiNi_{0.4}Co_{0.4}Mn_{0.2}O_2$.

The production of ternary cathode material precursor with high nickel content such as $[Ni_{0.8}Mn_{0.1}Co_{0.1}](OH)_2$ and $[Ni_{0.8}Co_{0.15}Al_{0.05}](OH)_2$ is more difficult than mono- and bi-metallic cathode materials with conventional mixing method.

In some embodiments, the first solution is prepared by dissolving a combination of at least three of a salt of nickel, a salt of manganese, a salt of cobalt, and a salt of aluminium in water at any temperature that is suitable for dissolution. Each of the salt of nickel, the salt of manganese, the salt of cobalt, and the salt of aluminium disclosed herein can independently include an anion selected from the group consisting of sulfate, nitrate, acetate, chloride and combinations thereof. Some non-limiting examples of the salt of nickel include nickel sulfate, nickel nitrate, nickel acetate and nickel chloride. Some non-limiting examples of the salt of manganese include manganese sulfate, manganese acetate and manganese chloride. Some non-limiting examples of the salt of cobalt include cobalt sulfate, cobalt nitrate, cobalt acetate and cobalt chloride. Some non-limiting examples of the salt of aluminium include aluminium sulfate, aluminium nitrate, aluminium acetate, aluminium chloride, and sodium aluminate.

In certain embodiments, the concentration of each of the salt of nickel, the salt of manganese, the salt of cobalt, and the salt of aluminium in the aqueous solution can be independently any concentration as long as it does not excess the critical saturated concentration. In some embodiment, a total molar concentration of the metal elements in the first solution is from about 0.1 mol/L to about 5 mol/L, from about 0.1 mol/L to about 4 mol/L, from about 0.1 mol/L, to about 3 mol/L, from about 0.1 mol/L to about 2 mol/L, from about 0.1 mol/L to about 1 mol/L, or from about 1 mol/L to about 3 mol/L.

In some embodiments, the mole fractions of each of the salt of nickel, the salt of cobalt, the salt of manganese, and the salt of aluminium in the first solution are independently from about 0 to about 1, from about 0 to about 0.9, from about 0 to about 0.8, from about 0 to about 0.7, from about 0 to about 0.6, from about 0 to about 0.5, from about 0 to about 0.4, from about 0 to about 0.3, from about 0 to about 0.2, from about 0 to about 0.1, from about 0 to about 0.05, or from about 0 to about 0.04.

In some embodiments, the mole fraction of the salt of nickel in the first suspension is greater than or equal to the mole fraction of the salt of cobalt, the salt of manganese and/or the salt of aluminium, or the total mole fraction of the salt of metal other than nickel in the first suspension. In certain embodiments, the mole fraction of the salt of nickel in the first solution is from about 0 to about 1, from about 0.3 to about 0.92, from about 0.3 to about 0.9, or from about 0.5 to about 0.8. In some embodiments, the mole fraction of the salt of nickel in the first solution is greater than 0.33, greater than 0.5, greater than 0.6, greater than 0.8, or greater than 0.9. In certain embodiments, the mole fraction of the salt of nickel in the first solution is about 0.33, about 0.5, about 0.6, about 0.8, about 0.9, or about 0.92.

In some embodiments, the mole fraction of each of the salt of cobalt and the salt of manganese in the first solution is independently from about 0 to about 1, from about 0 to about 0.5, from about 0 to about 0.33, from about 0 to about 0.2, or from about 0 to about 0.1. In certain embodiments, the mole fraction of each of the salt of cobalt and the salt of manganese in the first solution is independently about 0.33, about 0.2, about 0.1, about 0.05, or about 0.04.

In certain embodiments, the mole fraction of the salt of aluminium in the first solution is from about 0 to about 1, from about 0 to about 0.2, or from about 0 to about 0.1. In some embodiments, the mole fraction of the salt of aluminium in the first solution is less than 0.2, less than 0.1, less than 0.05, or less than 0.03An certain embodiment, the mole fraction of the salt of aluminium in the first solution is about 0.2, about 0.1, or about 0.05.

In some embodiments, the molar ratio of the salt of nickel:the salt of manganese:the salt of cobalt is about 1:1:1, about 5:3:2, about 6:2:2, about 8:1:1, about 9:0.5:0.5, or about 9.2:0.4:0.4. In certain embodiments, the molar ratio of the salt of nickel: the salt of cobalt: the salt of aluminium is about 8:1.5:0.15.

In certain embodiments, the second solution is prepared by dissolving a precipitating agent in water. Some non-limiting examples of the precipitating agent include sodium hydroxide, potassium hydroxide, calcium hydroxide, ammonium hydroxide, sodium carbonate, potassium carbonate, sodium hydrogencarbonate, potassium hydrogencarbonate, calcium hydrogencarbonate, and ammonium carbonate.

In some embodiments, the concentration of the precipitating agent in the second solution is from about 0.5 mol/L to about 8 mol/L, from about 0.5 mol/L to about 6 mol/L, from about 0.5 mol/L to about 4 mol/L, or from about 0.5 mol/L to about 2 mol/L.

The first and second solutions are pre-heated before feeding into the static mixer. One of the important conditions for the co-precipitation reaction is the pre-heating temperature, which affects s the quality and uniformity of the cathode material precursor. In some embodiments, each of the first and second solutions are independently pre-heated to the same temperature from about 30° C. to about 80° C., from about 40° C. to about 80° C., from about 50° C. to about 80° C., from about 60° C. to about 80° C., or from about 70° C. to about 80° C. In certain embodiments, each of the first and second solutions are independently pre-heated to the same temperature greater than 30° C., greater than 40° C., greater than 50° C. or greater than 60° C. In some embodiments, each of the first and second solutions are independently pre-heated to the same temperature at about 30° C. about 40° C., about 50° C., about 60° C., about 70° C., or about 80° C.

The pre-heated first solution and the pre-heated second solution are fed to a first inlet and a second inlet of a static mixer respectively to obtain a co-precipitating solution. Any static mixer that can be used to mix the two solutions can be used herein. The mixing element located in the flow path divides and recombines the feed materials. In some embodiments, the mixing element has a helical structure. The rotation and deflection of the co-precipitating solution along the helical paths provides a thorough mixing of the solution. These spiralling flow paths provide the desired rotation and mixing of materials and are particularly effective for mixing along circular conduits. The housing and/or mixing elements of the static mixer can be made of corrosion resistant plastics selected from the group consisting of polypropylene (PP), polytetrafluoroethylene (PTFE), polyvinyl chloride (PVC), copolymers thereof, and combinations thereof.

The pH of the co-precipitating solution is crucial to the formation of ternary cathode material precursor as co-precipitation that occurs over a narrow pH range can ensure formation of desirable composition of the cathode material precursor. Conventional methods of preparing a cathode material precursor comprise adding ammonia solution or ethylenediamine to the second solution or adding a third solution having ammonia or ethylenediamine, to the co-precipitating solution to control the pH of the co-precipitating solution. However, this often leads to a significant change of pH (e.g., ≥1 unit) throughout the process and the use of additional chemical increases the complexity of the preparation process. In the present invention, an automatic pH controller is coupled to the outlet of the static mixer to measure the pH of the co-precipitating solution. The automatic pH controller controls the flow rate of the pre-heated first solution and the pre-heated second solution fed into the static mixer according to the measured pH of the co-precipitating solution, thereby maintaining a constant pH of the co-precipitating solution. Therefore, a narrow pH range can be maintained with the help of an automatic pH controller.

In some embodiments, the pH of the co-precipitating solution s from about 8 to about 12, from about 8 to about 11, from about 8 to about 10, from about 8 to about 9, from about 9 to about 12, from about 9 to about 11, from about 9 to about 10, from about 10 to about 12, from about 10 to about 11, from about 8.5 to about 9.5, from about 9.5 to about 10.5, or from about 10.5 to about 11.5. In certain embodiments, the pH of the co-precipitating solution is less than 12, less than 11.5, less than 11, less than 10.5, less than 10, less than 9.5, less than 9, or less than 8.5. In some embodiments, the pH of the co-precipitating solution is greater than 8, greater than 8.5, greater than 9, greater than 9.5, greater than 10, greater than 10.5, greater than 11, or greater than 11.5. In certain embodiments, the pH of the co-precipitating solution is about 8, about 8.5, about 9, about 10, about 10.5, about 11, about 11.5, or about 12. In some embodiments, the change of the pH of the co-precipitating solution is less than 1 pH unit, less than 0.8 pH unit, less than 0.6 pH unit less than 0.4 pH unit, or less than 0.2 pH unit.

In certain embodiments, the pH controller comprises two pumps for pumping the pre-heated first solution and the pre-heated second solution into the static mixer. Some non-limiting examples of the pump include tubular diaphragm pumps, bellows pumps, peristaltic pump and diaphragm pumps. In some embodiments, each of the flow rates of the pre-heated first solution and the pre-heated second solution feeding into the static mixer is independently from about 6 L/hour to about 100 L/hour, from about 6 L/hour to about 80 L/hour, from about 6 L/hour to about 60 L/hour, from about 6 L/hour to about 40 L/hour, from about 6 L/hour to about 20 L/hour, or from about 6 L/hour to about 10 L/hour. In some embodiments, each of the flow rates of the pre-heated first solution and the pre-heated second solution feeding into the static mixer is independently greater than 5 L/hour, greater than 10 L/hour, greater than 15 L/hour, or greater than 20 L/hour.

In some embodiments, the pre-heated second solution or the co-precipitating solution is free of ammonia or ethylenediamine. In certain embodiments, the method of the present invention does not comprise a step of adding ammonia solution or ethylenediamine to the pre-heated second solution or the co-precipitating solution.

Since pH variation may affect the formation and quality of the cathode material precursor, the pH of the co-precipitating solution is monitored and regulated continuously during the operation of the static mixer. The volume of the static mixer should not be too large since there will be a delay of pH adjustment. The length of the static mixer is measured in the axial direction of the static mixer. The diameter of the static mixer is the internal diameter of the static mixer. The static mixer has a uniform circular cross-section along the length of the static mixer. In some embodiments, the length of the static mixer is from about 30 cm to about 100 cm, from about 30 cm to about 80 cm, from about 30 cm to about 60 cm, from about 30 cm to about 40 cm, from about 50 cm to about 100 cm, from about 50 cm to about 80 cm, or from about 50 cm to about 60 cm. In certain embodiments, the diameter of the static mixer is from about 1 mm to about 25 cm, from about 5 mm to about 20 cm, from about 5 mm to about 15 cm, from about 5 mm to about 10 cm, from about 5 mm to about 5 cm, from about 5 cm to about 20 cm, or from about 5 cm to about 15 cm. In some embodiments, the length of the static mixer is longer than the diameter of the static mixer. In some embodiments, the ratio of the length of the static mixer to the diameter of the static mixer is from about 2:1 to about 20:1, from about 5:1 to about 20:1, from about 10:1 to about 20:1, or from about 15:1 to about 20:1. In certain embodiments, the ratio of the length of the static mixer to the diameter of the static mixer is less than 20:1, less than 15:1, less than 10:1, or less than 5:1. In certain embodiments, the ratio of the length of the static mixer to the diameter of the static mixer is greater than 2:1, greater than 5:1, greater than 10:1, or greater than 15:1.

The static mixer of the present invention can be applied in any orientation. In some embodiments, the static mixer can be positioned horizontally or vertically. In certain embodiments, the static mixer can be operated in an inclined position.

In certain embodiments, the static mixer is coupled to a heating element surrounding at least a portion of the length of the static mixer. In some embodiments, the heating element is a heating jacket. In certain embodiments, the static mixer is heated by the heating jacket to the same temperature as the pre-heated first solution and the pre-heated second solution to maintain a constant temperature during co-precipitation. In this way, the co-precipitating solution in the static mixer can be at the same temperature as the pre-heated solutions, thereby reducing the temperature variation during the foundation of cathode material precursor, in some embodiments, the static mixer is heated to a temperature from about 30° C. to about 80° C., from about 40° C. to about 80° C., from about 50° C. to about 80° C., from about 60° C. to about 80° C., or from about 70° C. to about 80° C. In certain embodiments, the static mixer is heated by a heating jacket to a temperature greater than 30° C., greater than 40° C., greater than 50° C., or greater than 60° C.

The solutions, upon entering the static mixer, has a small viscosity. After mixing, the viscosity of the co-precipitating solution increases slowly as the mixture passes through the static mixer. Solids may accumulate in the static mixer and flow rate will be reduced, thereby adversely affecting mixing of the co-precipitating solution and formation of the desired composition of the cathode material precursor. The operation of the static mixer has to be ended in order to successfully remove the accumulated solids in the static mixer. However, this increases the complexity and lowers the efficiency of the preparation process. In some embodiments, the static mixer is coupled to an ultrasonicator. In certain embodiments, the static mixer is sonicated continuously or intermittently by the ultrasonicator to prevent precipitate from adhering on the surface of the mixing elements and the static mixer from becoming clogged during operation. In some embodiments, the ultrasonicator is operated from about 60 W to about 600 W, from about 60 W to about 400 W, from about 60 W to about 200 W, or from about 60 W to about 100 W. The static mixer coupled to an ultrasonicator allows a continuous mixing operation. Accumulation of solid from a previous batch is thereby minimized. In some embodiments, the static mixer can be operated continuously for a time period of more than 5 hours, more than 10 hours, more than 15 hours, more than 20 hours, more than 24 hours, more than 48 hours, or more than 72 hours.

The mixing time of the co-precipitating solution of the present invention is greatly reduced compared to conventional mixing method. In some embodiments, the co-precipitating solution is mixed in the static mixer for a time period from about 10 seconds to about 60 seconds, from about 10 seconds to about 50 seconds, from about 10 seconds to about 40 seconds, from about 20 seconds to about 60 seconds, from about 30 seconds to about 60 seconds, from about 40 seconds to about 60 seconds, or from about 40 seconds to about 50 seconds. In certain embodiments, the co-precipitating solution is mixed in the static mixer for a time period less than 2 minutes, less than 1.5 minutes, less than 1 minute, less than 50 seconds, less than 40 seconds, or less than 30 seconds.

A suspension of cathode material precursor is collected from the outlet of the static mixer. The suspension is filtered and washed with water to reduce the alkalinity of the cathode material precursor. In some embodiments, the suspension is washed with water for 1 to 5 times, 1 to 4 times, 1 to 3 times, or 1 to 2 times. In certain embodiments, the suspension is washed for a time period from about 15 minutes to about 2 hours, from about 15 minutes to about 1 hour, or from about 15 minutes to about 30 minutes.

In some embodiments, the cathode material precursor is $[Ni_aMn_bCo_cAl_{(1-a-b-c)}](OH)_2$ or $[Ni_aMn_bCo_cAl_{(1-a-b-c)}]CO_3$, wherein $0 \leq a < 1$, $0 \leq b < 1$, $0 \leq c < 1$, and $a+b+c \leq 1$. In certain embodiments, a is any number from about 0 to about 1, from about 0.33 to about 0.92, from about 0.33 to about 0.9, from about 0.33 to about 0.8, from about 0.33 to about 0.6, from about 0.5 to about 0.92, from about 0.5 to about 0.8, from about 0.6 to about 0.92, or from about 0.6 to about 0.9. In some embodiments, b and c is independently any number from about 0.01 to about 0.5, from about 0.04 to about 0.5, from about 0.04 to about 0.4, from about 0.1 to about 0.4, from about 0.1 to about 0.3, or from about 0.2 to about 0.4.

In certain embodiments, the cathode material precursor is $[Ni_{0.33}Mn_{0.33}Co_{0.33}](OH)_2$, $[Ni_{0.4}Mn_{0.4}Co_{0.2}](OH)_2$, $[Ni_{0.5}Mn_{0.3}Co_{0.2}](OH)_2$, $[Ni_{0.6}Mn_{0.2}Co_{0.2}](OH)_2$, $[Ni_{0.7}Mn_{0.15}Co_{0.15}](OH)_2$, $[Ni_{0.8}Mn_{0.1}Co_{0.1}](OH)_2$, $[Ni_{0.92}Mn_{0.04}Co_{0.04}](OH)_2$, $[Ni_{0.8}Mn_{0.15}Co_{0.05}](OH)_2$, $[Ni_{0.33}Mn_{0.33}Co_{0.33}]CO_3$, $[Ni_{0.4}Mn_{0.4}Co_{0.2}]CO_3$, $[Ni_{0.5}Mn_{0.3}Co_{0.2}]CO_3$, $[Ni_{0.6}Mn_{0.2}Co_{0.2}]CO_3$, $[Ni_{0.7}Mn_{0.15}Co_{0.15}]CO_3$, $[Ni_{0.8}Mn_{0.1}Co_{0.1}]CO_3$, $[Ni_{0.92}Mn_{0.04}Co_{0.04}]CO_3$, or $[Ni_{0.8}Co_{0.15}Al_{0.05}]CO_3$.

The cathode material precursor is then dried. Any dryer that can dry the cathode material precursor can be used herein. Some non-limiting examples of suitable dryer include a double-cone vacuum dryer, a microwave dryer, a microwave vacuum dryer, a hot air dryer, or a spray dryer. In some embodiments, the cathode material precursor is dried by a microwave dryer or a microwave vacuum dryer, wherein the dryer is operated at a power from about 5 kW to about 15 kW, from about 6 kW to about 20 kW, from about 7 kW to about 20 kW, from about 15 kW to about 70 kW, from about 20 kW to about 90 kW, from about 30 kW to about 100 kW, or from about 50 kW to about 100 kW.

In other embodiments, the cathode material precursor is dried by a vacuum dryer, a hot air dryer, or a spray dryer at a temperature from about 60° C. to about 105° C., from about 60° C. to about 100° C., from about 60° C. to about 90° C., from about 60° C. to about 80° C., from about 60° C. to about 70° C., from about 70° C. to about 90° C., or from about 70° C. to about 80° C. In some embodiments, the suspension is dried for a time period from about 4 hours to about 24 hours, from about 4 hours to about 20 hours, from about 4 hours to about 16 hours, from about 4 hours to about 12 hours, from about 4 hours to about 8 hours, or from about 4 hours to about 6 hours.

In some embodiments, the dried cathode material precursor has an average particle size D50 in the range from about 1 μm to about 12 μm, from about 1 μm to about 10 μm, from about 1 μm to about 8 ηm, from about 1 μm to about 6 μm, from about 1 μm to about 4 μm, from about 1 μm to about 2 μm, from about 5 μm to about 12 μm, from about 5 μm to about 10 μm, or from about 5 μm to about 8 μm. In certain embodiments, the dried cathode material precursor has an average particle size D50 less than 12 μm, less than 10 μm, less than 8 μm, less than 6 μm, less than 4 μm, or less than 2 μm. In some embodiments, the dried cathode material precursor has an average particle size D50 greater than 1 μm, greater than 2 μm, greater than 4 μm, greater than 6 μm, greater than 8 μm, or greater than 10 μm.

The method disclosed herein allows sufficiently uniform mixing of the two solutions in a very short time to obtain a suspension of uniform quality in a continuous process. In addition, rapid and uniform mixing of the two solutions gives a cathode material precursor with controlled composition and good uniformity in particle size. In some embodiment, the dried cathode material precursor has a D90/D10 ratio from about 1.2 to about 2.5, from about 1.2 to about 2.3, from about 1.2 to about 2.1, from about 1.2 to about 2, from about 1.2 to about 1.8, from about 1.3 to about 1.8, from about 1.3 to about 1.7, from about 1.3 to about 1.6, from about 1.3 to about 1.5, from about 1.3 to about 1.4, from about 1.4 to about 1.8, from about 1.5 to about 1.9, or from about 1.5 to about 1.8. In certain embodiments, the dried cathode material precursor has a D90/D10 ratio less than 2.5, less than 2.3, less than 2.1, less than 2, less than 1.9, less than 1.8 less than 1.7, less than 1.6, less than 1.5, less than 1.4, or less than 1.3.

The dried cathode material precursor is then mixed with one or more lithium salts to obtain a solid mixture in a homogenize. Some non-limiting examples of the lithium salts include lithium hydroxide, lithium carbonate, lithium fluoride, lithium acetate, and lithium oxalate.

In certain embodiments, the molar ratio of the metal element lithium of the one or more lithium salts to the total amount of the metal elements selected from a combination of at least three of nickel, manganese, cobalt, and aluminium is 1:1. Addition of excess lithium salt may lead to the formation of lithium oxide and lithium carbonate on the surface of the cathode material during calcination, resulting in poor electrochemical performance. The rechargeable battery may explode due to increased internal pressure caused by released gas, such as carbon dioxide.

In certain embodiments, the number of mole of the metal element lithium of the one or more lithium salts is greater than or equal to the total number of mole of the metal elements selected from a combination of at least three of nickel, manganese, cobalt, and aluminium. In some embodiments, the molar ratio of the metal element lithium of the one or more lithium salts to the total amount of the metal elements selected from a combination of at least three of nickel, manganese, cobalt, and aluminium is from about 1:1 to about 1.01:1, from about 1:1 to about 1.02:1, or from about 1:1 to about 1.03:1. In certain embodiments, the molar ratio of the metal element lithium of the one or more lithium salts to the total amount of the metal elements selected from a combination of at least three of nickel, manganese, cobalt, and aluminium is less than 1.05:1, less than 1.04:1, less than 1.03:1, less than 1.02:1, or less than 1.01:1. In some embodiments, the molar ratio of the metal element lithium to the total amount of the metal elements selected from a combination of at least three of nickel, manganese, cobalt, and aluminium in a lithium-rich cathode material is from about 1.5:1 to about 1.1:1, from about 1.5:1 to about 1.2:1, from about 1.5:1 to about 1.3:1, or from about 1.5:1 to about 1.4:1. In certain embodiments, the molar ratio of the metal element lithium to the total amount of the metal elements selected from a combination of at least three of nickel, manganese, cobalt, and aluminium in a lithium-rich cathode material is greater than 1.1:1, greater than 1.2:1, greater than 1.3:1, or greater than 1.4:1.

Any homogenizer that can evenly mix the dried cathode material precursor with the one or more lithium salts to obtain a solid mixture can be used herein. In some embodiments, homogenizer may be operated dry without adding any liquid. Some non-limiting examples of the homogenizer include a blender, a single helix cone mixer, a double helix cone mixer, a blade mixer, a stirring mixer, and a ball mill. In some embodiments, the stirring speed of the homogenizer is from about 5,000 rpm to about 15,000 rpm, from about 5,000 rpm to about 10,000 rpm, from about 5,000 rpm to about 9,000 rpm, from about 5,000 rpm to about 8,000 rpm, from about 5,000 rpm to about 7,000 rpm, or from about 5,000 rpm to about 6,000 rpm. In certain embodiments, the solid mixture is homogenized for a time period from about 0.5 hour to about 3 hours, from about 0.5 hour to about 2 hours, or from about 0.5 hour to 1 hour.

In certain embodiments, homogenizer may be operated in the presence of a solvent or water. The solid mixture can be dispersed in an aqueous solvent to form a slurry. Some non-limiting examples of the homogenizer for homogenizing the slurry include a blender, a stirring mixer, a mill, an ultrasonicator, a rotor-stator homogenizer, a planetary stirring mixer, a high pressure homogenizer, and combinations thereof.

After the mixing step, the solid mixture or the slurry can be calcined in a furnace or an oven to produce a cathode material. Any furnace or oven that can calcine the solid mixture or the slurry can be used herein. In some embodiments, the calcination process is performed by a furnace. Some non-limiting examples of the furnace include a box furnace, a push-plate tunnel furnace and a rotary furnace.

In some embodiments, the solid mixture or the slurry can be calcined under atmospheric pressure. In certain embodiments, the solid mixture can be calcined under an atmosphere with an oxygen content higher than 21%. In some embodiments, the oxygen content in the calcining process is at least 22%, at least 25%, at least 30%, at least 32%, at least 34%, at least 36%, at least 40%, at least 45%, at least 50%, at least 55%, at least 60%, at least 65%, at least 70%, at least 75%, at least 80%, at least 85%, at least 90%, at least 95%, or at least 99%. In some embodiments, the oxygen content in the calcining process is at most 25%, at most 30%, at most 35%, at most 40%, at most 45%, at most 50%, at most 55%, at most 60%, at most 65%, at most 70%, at most 75%, at most 80%, at most 85%, at most 90%, at most 95%, or at most 99%. In certain embodiments, the oxygen content in the calcining process is 100%. In general, the reaction time for complete transformation of the cathode material precursor into the corresponding metal oxide decreases with increasing oxygen content. In other embodiments, the solid mixture can be calcined under and inert atmosphere.

In further embodiments, the furnace comprises an agitation device which is used for agitating the powdered solids. In still further embodiments, the agitation device comprises a rotating blade or paddle.

Heat transfer in the rotary furnace and furnace equipped with a stirring apparatus is usually much more efficient than static furnace because they offer the advantage of providing agitation to powdered solids. Mechanism of agitation ensures uniform heating of the powdered solids. This overcomes the problem of long reaction times often experienced by processing in a box furnace and hence lowers the operating costs.

In some embodiments, calcination of the solid mixture or the slurry is carried out in two stages consisting of a first stage and a second stage, wherein the temperature of the first stage is lower than the temperature of the second stage. In the first stage, the cathode material precursor is converted to the corresponding metal oxide. In the second stage, the corresponding metal oxide is converted to the final lithium metal oxide product.

The temperature in the first stage can be within the range of 350° C. to 550° C. In some embodiments, the solid mixture or the slurry is calcined in the first stage at a temperature from about 350° C. to about 500° C., from about 350° C. to about 450° C., or from about 350° C. to about 400° C. In certain embodiments, the solid mixture or the slurry is calcined in the first stage at a temperature less than 550° C., less than 500° C., or less than 450° C. In certain embodiments, the solid mixture or the slurry is calcined in the first stage at a temperature at about 350° C., about 400° C., about 450° C., about 500° C., or about 550° C. In some embodiments, the solid mixture or the slurry is calcined in the first stage for a time period from about 2 hours to about 10 hours, from about 2 hours to about 8 hours, from about 2 hours to about 6 hours, or from about 2 hours to about 4 hours.

The temperature in the second stage can be within the range of 750° C. to 950° C. In some embodiments, the solid mixture is calcined in the second stage at a temperature from about 750° C. to about 900° C., from about 750° C. to about 850° C., or from about 750° C. to about 800° C. In certain embodiments, the solid mixture is calcined in the second stage at a temperature greater than 750° C., greater than 800° C., greater than 850° C., or greater than 900° C. In some embodiments, the solid mixture is calcined in the second stage for a time period from about 6 hours to about 15 hours, from about 6 hours to about 14 hours, from about 6 hours to about 12 hours, from about 6 hours to about 10 hours, or from about 6 hours to about 8 hours.

In some embodiments, a desired temperature can be reached by gradually increasing the temperature of the furnace. In certain embodiments, the temperature is increased at a rate from about 1° C./minute to about 10° C./minute, from about 1° C./minute to about 8° C./minute, from about 1° C./minute to about 6° C./minute, from about 1° C./minute to about 4° C./minute, from about 2° C./minute to about 2° C./minute, from about 4° C./minute to about 10° C./minute, from about 4° C./minute to about 8° C./minute, or from about 4° C./minute to about 6° C./minute.

After the calcining step, the calcined product can be cooled to room temperature. In some embodiments, the calcined product is cooled by decreasing the temperature gradually. In certain embodiments, the temperature of the calcination process is reduced at a rate from about 1° C./minute to about 5° C./minute, from about 2° C./minute to about 5° C./minute, from about 3° C./minute to about 5° C./minute, from about 2° C./minute to about 6° C./minute, from about 3° C./minute to about 6° C./minute, or from about 1° C./minute to about 4° C./minute.

In some embodiments, the particles of the calcined product can be separated by using a screen or a sieve. The material is placed on the screen and then the screen is shaken to allow the smaller particles to flow through. The "overs" are the particles that remain on the screen and the "unders" are the particles that pass through the screen.

In certain embodiments, the isolating step is performed by passing through a mesh sieve having a range from about 200 to about 500. In certain embodiments, the isolating step is performed by passing through a mesh sieve of about 200, about 300, about 400, or about 500. In further embodiments, the isolating step can be performed twice with two sieves of different mesh sizes. The particles of the calcined product pass through a mesh sieve of the desired mesh size. The isolated particles of the calcined product from the first isolating step can then pass through a second mesh sieve of a smaller mesh to reduce the size of the particles even further. In still further embodiments, the isolated particles of the calcined product from the second isolating step can pass through mesh sieves with mesh sizes that continue to become smaller.

In some embodiments, the D50 of the cathode material is from about 3 μm to about 15 μm, from about 3 μm to about 13 μm, from about 3 μm to about 11 μm, from about 3 μm to about 9 μm, from about 3 μm to about 7 μm, or from about 3 μm to about 5 μm. In some embodiments, the D50 of the cathode material is about 3 μm, about 5 μm, about 7 μm, about 9 μm, about 11 μm, about 13 μm, or about 15 μm.

The cathode material has a uniform particle size and a D90/D10 ratio of about 1.3 to about 1.9. In some embodiments, the D90/D10 ratio of the cathode material is from about 1.4 to about 1.9, from about 1.4 to about 1.8, from about 1.4 to about 1.7, from about 1.4 to about 1.6, or from about 1.4 to about 1.5. In certain embodiments, the D90/D10 ratio of the cathode material is about 1.3, about 1.4, about 1.5, about 1.6, about 1.7, about 1.8, or about 1.9.

The cathode material disclosed herein has excellent cycling properties and overall capacity as a result of a relatively high tapped density combined with a high specific capacity. In some embodiments, the tapped density of the cathode material is from about 1.6 g/cm$^3$ to about 3 g/cm$^3$, from about 1.6 g/cm$^3$ to about 2.8 g/cm$^3$, from about 1.6 g/cm$^3$ to about 2.6 g/cm$^3$, from about 1.6 g/cm$^3$ to about 2.4 g/cm$^3$, from about 1.6 g/cm$^3$ to about 2.2 g/cm$^3$, from about 1.6 g/cm$^3$ to about 2.0 g/cm$^3$, or from about 1.6 g/cm$^3$ to about 1.8 g/cm$^3$. In certain embodiments, the tapped density of the cathode material is about 1.6 g/cm$^3$, about 1.8 g/cm$^3$, about 2.0 g/cm$^3$, about 2.2 g/cm$^3$, about 2.4 g/cm$^3$, about 2.6 g/cm$^3$, about 2.8 g/cm$^3$, or about 3.0 g/cm$^3$. As a result of the high tapped density and excellent cycling performance, the battery exhibits continuing high total capacity when cycled.

In some embodiments, the second solution or the co-precipitating solution does not comprise a complexing agent for the purposes of improving the physical and/or chemical properties of the cathode material precursor. In certain embodiments, the method of the present invention does not comprise a step of adding a complexing agent to the pre-heated second solution or the co-precipitating solution. Some non-limiting examples of the complexing agent include ammonia, ethylenediaminetetraacetic acid (EDTA), and ethylene glycol-bis(β-ammoethyl ether)-N,N,N',N'-tetraacetic acid (EGTA).

The method disclosed herein permits production of a ternary cathode material having good uniformity. The combination of excellent cycling performance and high overall capacity makes the resulting lithium-ion batteries an improved power source, particularly for high energy applications, such as electric vehicles.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Particle size distributions of the dried cathode material precursor and the cathode material were measured by a laser diffraction particle size distribution analyzer (Mastersizer 3000, Malvern Instruments Ltd., UK). Samples were delivered to the measurement area of the optical bench in a stable state of dispersion. The measurement of particle sizes was carried out while the particles were sufficiently dispersed.

The tapped density measurement of the cathode material was carried out by mechanically tapping a graduated measuring cylinder (100 mL) containing the sample (mass W). After observing the initial powder volume, the measuring cylinder was mechanically tapped by a tapping machine until no further volume (V in cm$^3$) change was observed. The TD was calculated as TD=W/V. The TD measurement was carried out on a tapped density tester (SVM 223, obtained from Erweka GmbH, Germany).

The thickness of pouch cells was measured by a micrometer (293-240-30, Mitutoyo Corporation, Japan) having a measuring range from 0 mm to 25 mm.

Example 1

A) Preparation of a First Solution

A first solution was prepared by dissolving 4.38 kg of nickel sulphate hexahydrate (NiSO$_4$.6H$_2$O; #227676, obtained from Sigma-Aldrich, US), 2.81 kg of manganese sulphate monohydrate (MnSO$_4$.H$_2$O; #31425, obtained from Sigma-Aldrich, US) and 4.68 kg of cobalt sulphate heptahydrate (CoSO$_4$.7H$_2$O; #C6768, obtained from Sigma-Aldrich, US) in 20 L of de-ionzied water. The total concentration of the metal ions in the first solution was 2.5 mol/L.

B) Preparation of a Second Solution

A second solution was prepared by dissolving 5.3 kg of sodium carbonate (Na$_2$CO$_3$; #791768, obtained from Sigma-Aldrich, US) in 20 L of de-ionized water. The concentration of the sodium carbonate in the second solution was 2.5 mol/L.

C) Preparation of a Suspension

The first and second solutions were pre-heated and incubated in a water bath at 60° C. to obtain a pre-heated first solution and a pre-heated second solution. A static mixer made of polypropylene (obtained from Dongguan Yihui Adhesive Co. Ltd., China), having a diameter of 5 cm and a length of 50 cm, and equipped with a heating jacket (obtained from Jiangsu Tianling Instruments Co Ltd.) was used. The static mixer was heated to 60° C. The pre-heated first solution and the pre-heated second solution were fed into a first inlet and a second inlet of the pre-heated static mixer at a flow rate of 10 L/hour respectively to form a co-precipitating solution in the static mixer. The static mixer was coupled to an ultrasonicator (G-100ST; obtained from Shenzhen Geneng Cleaning Equipment Co. Ltd., China) which was operated continuously at 500 W. A suspension was eluted from an outlet of the static mixer. The flow rate measured at the outlet of the static mixer was 20.2 L/hour. The co-precipitating solution was mixed in the static mixer for about 40 seconds. The pH of the co-precipitating solution was continuously monitored and maintained by an automatic pH controller (obtained from Sichen instruments Technology Co. Ltd, China) coupled to the outlet of the static mixer. The pH controller comprised two peristaltic pumps for controlling the flow rate of the pre-heated first solution and the pre-heated second solution to maintain a constant pH in the co-precipitating solution. The pH of the co-precipitating solution is shown in Table 1 below.

D) Preparation of a Cathode Material Precursor

The suspension was filtered and washed with de-ionized water 3 times for 15 minutes each to obtain a cathode material precursor. The cathode material precursor was dried in an oven (DZF-6050, obtained from Shanghai Hasuc instrument Manufacture Co. Ltd., China) at 80° C. for 6 hours to obtain a dried cathode material precursor. The yield of the dried cathode material precursor is shown in Table 2 below. The particle size distribution of the dried cathode material precursor is shown in Table 3 below.

E) Preparation of a Cathode Material

A solid mixture was obtained by mixing the dried cathode material precursor with 3.774 kg of lithium carbonate (Li$_2$CO$_3$, obtained from Aladdin Industries Corporation, China) in a molar ratio of lithium salt to total metal salt (Ni, Mn, Co) of 1.02:1 in a blender (obtained from VWR, US) operated at a stirring speed of 5,000 rpm for 1 hour. The solid mixture was then heated in a rotary furnace (KY—R—SJQ130, obtained from Xianyang Institute of Ceramics Industry, Thermal Equipment Center, Shanxi, China) rotating with a speed of about 0.5 round per minute in open air to 460° C. at a heating rate of 2° C./minute and further calcined for 5 hours at 460° C. Then, the temperature in the rotary furnace was increased to 900° C. at a heating rate of 2° C./minute and the mixture was further calcined for 10 hours. The calcined product was cooled to room temperature at a rate from 2° C./minute to 5° C./minute for 6 hours. A cathode material NMC333 was obtained by sieving the calcined product through a 300 mesh sieve. The formulation of Example 1 is shown in Table 1 below. The yield, particle size distribution and tapped density of the cathode material are shown in Tables 2, 3 and 4 below respectively.

F) Preparation of a Cathode Slurry

A positive electrode slurry was prepared by mixing 91 wt. % cathode material prepared in Example 1, 4 wt. carbon black (SuperP; Timcal Ltd, Bodio, Switzerland), and 5 wt. % polyvinylidene fluoride (PVDF; Sole® 5130, obtained from Solvay S.A., Belgium) N-methyl-2-pyrrolidone (NMP; purity of ≥99%, Sigma-Aldrich. US) to form a slurry having a solid content of 50 wt. %. The slurry was homogenized by a planetary stirring mixer (200 L mixer, Chienemei Industry Co. Ltd., China) for 6 hours operated at a stirring speed of 20 rpm and a dispersing speed of 1,500 rpm to obtain a homogenized slurry.

G) Assembling of Coin Cells

A positive electrode was prepared by coating the cathode slurry onto one side of an aluminium foil having a thickness of 9 μm using a doctor blade coater (MSK-AFA-III; obtained from Shenzhen KejingStar Technology Ltd., China) with an area density of about 7 mg/cm$^2$. The coated film on the aluminium foil was dried by an electrically heated conveyor oven set at 90° C. for 2 hours.

The electrochemical performance of the cathode prepared above was tested in CR2032 coin cells assembled in an argon-filled glove box. The coated cathode sheet was cut into disc-form positive electrodes for coin cell assembly. A lithium metal foil having a thickness of 500 μm was used as a counter electrode. The electrolyte was a solution of LiPF$_6$ (1 M) in a mixture of ethylene carbonate (EC), ethyl methyl carbonate (EMC) and dimethyl carbonate (DMC) in a volume ratio of 1:1:1. The electrochemical performance of the coin cell of Example 1 was measured and is shown in Table 6 below, H) Preparation of a Pouch Cell I) Preparation of a Positive Electrode The homogenized cathode slurry prepared above was coated onto both sides of an aluminium foil having a thickness of 20 μm using a transfer coater (ZY-TSF6-6518, obtained from Jin Fan Zhanyu New Energy Technology Co. Ltd., China) with an area density of about 26 mg/cm$^2$. The coated films on the aluminium foil were dried for 3 minutes by a 24-meter-long conveyor hot air drying oven as a sub-module of the transfer coater operated at a conveyor speed of about 8 meters/minute to obtain a positive electrode. The temperature-programmed oven allowed a controllable temperature gradient in which the temperature gradually rose from the inlet temperature of 55° C. to the outlet temperature of 80° C.

II) Preparation of a Negative Electrode

A negative electrode slurry was prepared by mixing 90 wt. % hard carbon (HC; 99.5% purity, Ruifute Technology Ltd., Shenzhen, Guangdong, China), 5 wt. % carbon black and 5 wt. % PVDF in NMP to form a slurry having a solid content of 50 wt. %. The slurry was homogenized by a planetary mixer.

The slurry was coated onto both sides of a copper foil having a thickness of 9 μm using a transfer coater with an area density of about 15 mg/cm$^2$. The coated films on the copper foil were dried at about 50° C. for 2.4 minutes by a 24-meter-long conveyor hot air dryer operated at a conveyor speed of about 10 meters/minute to obtain a negative electrode.

III) Assembling of a Pouch Cell

After drying, the resulting cathode film and anode film were used to prepare the cathode and anode respectively by cutting them into individual electrode plates. A pouch cell was assembled by stacking the cathode and anode electrode plates alternatively and then packaged in a case made of an aluminium-plastic laminated film. The cathode and anode electrode plates were kept apart by separators and the case was pre-formed. An electrolyte was then filled into the case holding the packed electrodes in high-purity argon atmosphere with moisture and oxygen content less than 1 ppm. The electrolyte was a solution of LiPF$_6$ (1 M) in a mixture of ethylene carbonate (EC), ethyl methyl carbonate (EMC) and dimethyl carbonate (DMC) in a volume ratio of 1:1:1, After electrolyte filling, the pouch cell was vacuum sealed and then mechanically pressed using a punch tooling with standard square shape. The electrochemical performance of the pouch cell of Example 1 was measured and is shown in Table 6 below. The volume expansions of the pouch cell of Example 1 at the end of the first and twentieth charging processes were measured and the results are shown in Table 7 below.

Example 2

A coin cell and a pouch cell were prepared in the same manner as in Example 1, except that the molar ratio of Ni, Co and Mn was adjusted to obtain a cathode material NMC532. A first solution was prepared by dissolving 6.57 kg of nickel sulphate hexahydrate 2.53 kg of manganese sulphate monohydrate and 2.81 kg of cobalt sulphate heptahydrate in de-ionized water. The total concentration of the metal ions in the first solution was 2.5 mol/L. The formulation of Example 2 is shown in Table 1 below.

Example 3

A coin cell and a pouch cell were prepared in the same manner as in Example 1, except that the molar ratio of Ni, Co and Mn was adjusted to obtain a cathode material NMC622. A first solution was prepared by dissolving 7.89 kg of nickel sulphate hexahydrate, 1.69 kg of manganese sulphate monohydrate and 2.81 kg of cobalt sulphate heptahydrate in de-ionized water. The total concentration of the metal ions in the first solution was 2.5 mol/L. The formulation of Example 3 is shown in Table 1 below.

Example 4

A coin cell and a pouch cell were prepared in the same manner as in Example 1, except that the molar ratio of Ni, Co and Mn was adjusted to obtain a cathode material NMC811. A first solution was prepared by dissolving 10.5 kg of nickel sulphate hexahydrate, 0.845 kg of manganese sulphate monohydrate and 1.41 kg of cobalt sulphate heptahydrate in de-ionized water. The total concentration of the metal ions in the first solution was 2.5 mol/L. The formulation of Example 4 is shown in Table 1 below.

Figure 2:
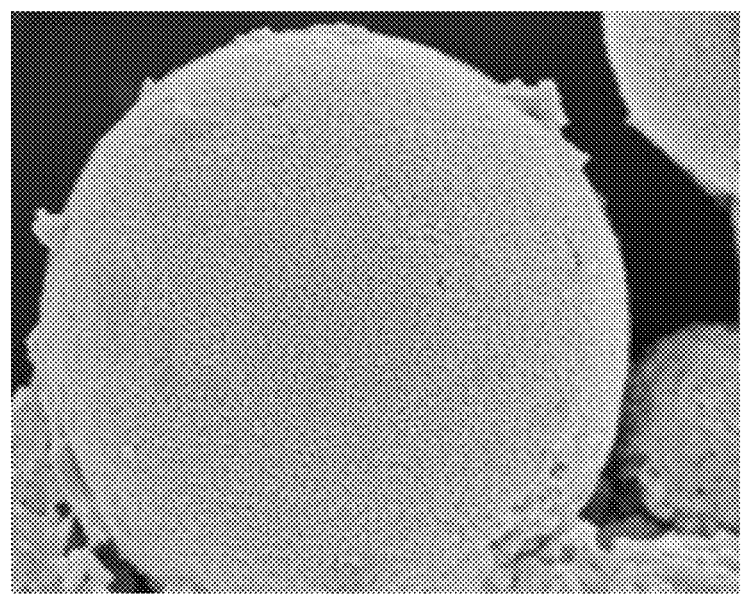
FIG. 2 depicts a SEM image of the surface morphology of the cathode material of Example 4.

FIG. 2 shows the SEM image of the surface morphology of the cathode material. The morphology of the cathode material was characterized by a scanning electron microscope (S4800, Hitachi, Japan).

Example 5

A coin cell and a pouch cell were prepared in the same manner as in Example 1, except that the cathode material NCA was prepared and a first solution was prepared by dissolving 10.5 kg of nickel sulphate hexahydrate, 2.11 kg of cobalt sulphate heptahydrate and 1.14 kg of anhydrous aluminium sulphate in de-ionized water. The total concentration of the metal ions in the first solution was 2.5 mol/L. The formulation of Example 5 is shown in Table 1 below.

Example 6

A coin cell and a pouch cell were prepared in the same manner as in Example 1, except that the molar ratio of Li, Ni, Co and Mn was adjusted to obtain a cathode material $0.4Li_2MnO_3 \cdot 0.6LiNi_{0.33}Mn_{0.33}Co_{0.33}O_2$. A first solution was prepared by dissolving 2.63 kg of nickel sulphate hexahydrate, 5.07 kg of manganese sulphate monohydrate and 2.81 kg of cobalt sulphate heptahydrate in de-ionized water. A solid mixture was obtained by mixing the dried cathode material precursor with 5.18 kg of lithium carbonate in a molar ratio of lithium salt to total metal salt of 1.4:1 in a blender operated at a stirring speed of 5,000 rpm for 1 hour. The formulation of Example 6 is shown in Table 1 below.

Example 7

A coin cell and a pouch cell were prepared in the same manner as in Example 4, except that sodium hydroxide (NaOH, obtained from Aladdin Industries Corporation, China) was used instead of sodium carbonate as a precipitating agent. A second solution was prepared by dissolving 4 kg of sodium hydroxide in de-ionized water. The concentration of sodium hydroxide in the second solution was 5 mol/L. The formulation of Example 7 is shown in Table 1 below.

Example 8

A coin cell and a pouch cell were prepared in the same manner as in Example 4, except that a static mixer having a diameter of 10 cm and a length of 80 cm was used and the co-precipitating solution was mixed in the static mixer for about 60 seconds. The formulation of Example 8 is shown in Table 1 below.

Example 9

A coin cell and a pouch cell were prepared in the same manner as in Example 4, except that the static mixer was operated for 24 hours. A first solution was prepared by dissolving 252 kg of nickel sulphate hexahydrate, 20.3 kg of manganese sulphate monohydrate and 33.8 kg of cobalt sulphate heptahydrate in 240 L of de-ionized water. A second solution was prepared by dissolving 127.2 kg of sodium carbonate in 240 L of de-ionized water. The flow rate measured at the outlet of the static mixer was 20 L/hour. The formulation of Example 9 is shown in Table 1 below. The flow rate of suspension discharged from the outlet of the static mixer of Example 9 is shown in Table 5 below.

Comparative Example 1

A coin cell and a pouch cell were prepared in the same manner as in Example 1, except that the pH of the co-precipitation solution was not adjusted. The formulation of Comparative Example 1 is shown in Table 1 below.

Comparative Example 2

A coin cell and a pouch cell were prepared in the same manner as in Example 4, except that the pH of the co-precipitation solution was not adjusted. The formulation of Comparative Example 2 is shown in Table 1 below.

Comparative Example 3

A coin cell and a pouch cell were prepared in the same manner as in Example 5, except that the pH of the co-precipitation solution was not adjusted. The formulation of Comparative Example 3 is shown in Table 1 below.

Comparative Example 4

A coin cell and a pouch cell were prepared in the same manner as in Example 4, except that the first and second solutions were not pre-heated. The formulation of Comparative Example 4 is shown in Table 1 below.

Comparative Example 5

A coin cell and a pouch cell were prepared in the same manner as in Example 5, except that the first and second solutions were not pre-heated. The formulation of Comparative Example 5 is shown in Table 1 below.

Comparative Example 6

A coin cell and a pouch cell were prepared in the same manner as in Example 6, except that the first and second solutions were not pre-heated. The formulation of Comparative Example 6 is shown M Table 1 below.

Comparative Example 7

A coin cell and a pouch cell were prepared in the same manner as in Example 3, except that a static mixer without a heating jacket was used. The formulation of Comparative Example 7 is shown in Table 1 below.

Comparative Example 8

A coin cell and a pouch cell were prepared in the same manner as in Example 4, except that $Li_2CO_3$ and the dried cathode material precursor were mixed in a molar ratio of 1.07:1. The formulation of Comparative Example 8 is shown in Table 1 below.

Comparative Example 9

A coin cell and a pouch cell were prepared in the same manner as in Example 1, except that the first and second solutions were mixed with mechanical stiring instead of a static mixer. A suspension was prepared by mixing a first solution and a second solution in a 50 L vessel (obtained from Zhengzhou Ketai Laboratory Instruments Co. Ltd, China) at a speed of 1,000 rpm for 10 hours. The first and second solutions were respectively pumped to a 50 L vessel at a flow rate of 10 L/hour. The formulation of Comparative Example 9 is shown in Table 1 below.

Comparative Example 10

A coin cell and a pouch cell were prepared in the same manner as in Example 3, except that the first and second solutions were mixed with mechanical stirring instead of a static mixer. A suspension was prepared by mixing a first solution and a second solution in a 50 L vessel at a speed of 1,000 rpm for 10 hours. The first and second solutions were respectively pumped to a 50 L vessel at a flow rate of 10 L/hour. The formulation of Comparative Example 10 is shown in Table 1 below.

Comparative Example 11

A coin cell and a pouch cell were prepared in the same manner as in Example 4, except that the first and second solutions were mixed with mechanical stirring instead of a static mixer. A suspension was prepared by mixing a first solution and a second solution in a 50 L vessel at a speed of 1,000 rpm for 10 hours. The first and second solutions were respectively pumped to a 50 L vessel at a flow rate of 10 L/hour. The formulation of Comparative Example 11 is shown in Table 1 below.

Comparative Example 12

A coin cell and a pouch cell were prepared in the same manner as in Example 5, except that the first and second solutions were mixed with mechanical stirring instead of a static mixer. A suspension was prepared by mixing a first solution and a second solution in a 50 L vessel at a speed of 1,000 rpm for 24 hours. The first and second solutions were respectively pumped to a 50 L vessel at a flow rate of 10 L/hour. The formulation of Comparative Example 12 is shown in Table 1 below.

Comparative Example 13

A coin cell and a pouch cell were prepared in the same manner as in Example 4, except that the ultrasonicator was not used and the static mixer was operated continuously. The formulation of Comparative Example 13 is shown in Table 1 below. The flow rate of the suspension discharged from the outlet of the static mixer of Comparative Example 13 is shown in Table 5 below.

Comparative Example 14

A coin cell and a pouch cell were prepared in the same manner as in Example 1, except that sodium carbonate and ammonia solution were used instead of sodium carbonate for preparing a second solution; the pH controller was not used; the first and second solutions were no pre-heated; and a static mixer without a heating jacket was used. A second solution was prepared by dissolving 14 kg of sodium carbonate in 20 L of de-ionized water, and adding 4.25 L of ammonia solution. The concentration of sodium carbonate and ammonia in the second solution were 5.44 mol/L and 10.3 mol/L respectively.

The first and second solutions were fed into a first inlet and a second inlet of the static mixer at a flow rate of 5 L/minute respectively to form a co-precipitating solution in the static mixer. The pH of the co-precipitating solution was not adjusted by the pH controller. The pH of the co-precipitating solution is shown in Table 1 below.

The suspension eluted from the outlet of the static mixer was left to stand for 2 hours, filtered and washed with de-ionized water 3 times for 15 minutes each to obtain the cathode material precursor. The cathode material precursor was dried in a spray dryer. The yield of the dried cathode material precursor is shown in Table 2 below. The dried cathode material precursor was calcined at 460° C. for 5 hours in a rotary furnace rotating with a speed of about 0.5 round per minute.

A solid mixture was obtained by mixing the dried cathode material precursor with lithium salt in a molar ratio of lithium salt to total metal salt (Ni, Mn, Co) of 1.02:1 in a planetary-type ball mill (Changsha MITR Instrument & Equipment Co. Ltd., China) with zirconium oxide ($ZrO_2$) balls operated at a rotation speed of 150 rpm and spinning speed of 250 rpm. After mixing for 2 hours, a homogenized solid mixture was obtained.

The solid mixture was then calcined in a rotary furnace rotating with a speed of about 0.5 round per minute in open air at 900° C. for 10 hours. The calcined product was cooled to room temperature at a rate from 3° C./minute to 5° C./minute for 6 hours. The formulation of Comparative Example 14 is shown in Table 1 below. The yield, particle size distribution and tapped density of the cathode material are shown in Table 2, 3 and 4 below respectively.

Comparative Example 15

A coin cell and a pouch cell were prepared in the same manner as in Example 14, except that NMC811 was used instead of NMC333 as a cathode material. The formulation of Comparative Example 15 is shown in Table 1 below.

TABLE 1

| | Ni:Mn:Co:Al ratio | Precipitating agent | pH of CoP solution | Temp. control of heating jacket and $1^{st}$ and $2^{nd}$ solutions | Temp. of CoP solution (° C.) | Mixing |
|---|---|---|---|---|---|---|
| Example 1 | 1:1:1:0 | $Na_2CO_3$ | 10.0 ± 0.1 | Yes | 60 | Static mixer |
| Example 2 | 5:3:2:0 | $Na_2CO_3$ | 10.5 ± 0.1 | Yes | 60 | Static mixer |
| Example 3 | 6:2:2:0 | $Na_2CO_3$ | 11.0 ± 0.1 | Yes | 60 | Static mixer |
| Example 4 | 8:1:1:0 | $Na_2CO_3$ | 11.0 ± 0.1 | Yes | 60 | Static mixer |
| Example 5 | 8:0:1.5:0.5 | $Na_2CO_3$ | 11.0 ± 0.1 | Yes | 60 | Static mixer |
| Example 6 | 1:3:1:0 | $Na_2CO_3$ | 11.0 ± 0.1 | Yes | 60 | Static mixer |
| Example 7 | 8:1:1:0 | NaOH | 11.0 ± 0.1 | Yes | 60 | Static mixer |
| [1]Example 8 | 8:1:1:0 | $Na_2CO_3$ | 11.0 ± 0.1 | Yes | 60 | Static mixer |
| Example 9 | 8:1:1:0 | $Na_2CO_3$ | 11.0 ± 0.1 | Yes | 60 | Static mixer (run 24 hrs) |
| Comparative Example 1 | 1:1:1:0 | $Na_2CO_3$ | 9.0-11.0 (un-adjusted) | Yes | 60 | Static mixer |
| Comparative Example 2 | 8:1:1:0 | $Na_2CO_3$ | 9.0-12.0 (un-adjusted) | Yes | 60 | Static mixer |

TABLE 1-continued

| | Ni:Mn:Co:Al ratio | Precipitating agent | pH of CoP solution | Temp. control of heating jacket and 1st and 2nd solutions | Temp. of CoP solution (° C.) | Mixing |
|---|---|---|---|---|---|---|
| Comparative Example 3 | 8:0:1.5:0.5 | $Na_2CO_3$ | 9.0-11.0 (un-adjusted) | Yes | 60 | Static mixer |
| Comparative Example 4 | 8:1:1:0 | $Na_2CO_3$ | 11.0 ± 0.1 | 1st and 2nd solutions (not preheated) | 25-45 | Static mixer |
| Comparative Example 5 | 8:0:1.5:0.5 | $Na_2CO_3$ | 11.0 ± 0.1 | 1st and 2nd solutions (not preheated) | 25-40 | Static mixer |
| Comparative Example 6 | 1:3:1:0 | $Na_2CO_3$ | 11.0 ± 0.1 | 1st and 2nd solutions (not preheated) | 25-45 | Static mixer |
| Comparative Example 7 | 6:2:2:0 | $Na_2CO_3$ | 11.0 ± 0.1 | Static mixer without heating jacket | 40-60 | Static mixer |
| [2]Comparative Example 8 | 8:1:1:0 | $Na_2CO_3$ | 11.0 ± 0.1 | Yes | 60 | Static mixer |
| Comparative Example 9 | 1:1:1:0 | $Na_2CO_3$ | 10.0 ± 0.2 | Yes | 60 | Mechanical stirring |
| Comparative Example 10 | 6:2:2:0 | $Na_2CO_3$ | 11.0 ± 0.2 | Yes | 60 | Mechanical stirring |
| Comparative Example 11 | 8:1:1:0 | $Na_2CO_3$ | 11.0 ± 0.2 | Yes | 60 | Mechanical stirring |
| Comparative Example 12 | 8:0:1.5:0.5 | $Na_2CO_3$ | 11.0 ± 0.2 | Yes | 60 | Mechanical stirring |
| Comparative Example 13 | 8:1:1:0 | $Na_2CO_3$ | 11.0 ± 0.1 (0-4 hrs); 11.0 ± 1 (5-10 hrs) | Yes | 60 | Static mixer without ultrasonic-ation |
| Comparative Example 14 | 1:1:1:0 | $Na_2CO_3$ | 9.5-10.5 | Static mixer without heating jacket | 20 | Static mixer |
| Comparative Example 15 | 8:1:1:0 | $Na_2CO_3$ | 10.5-11.5 | Static mixer without heating jacket | 20 | Static mixer |

Note:
[1] A static mixer having a diameter of 10 cm and a length of 80 cm was used.
[2] $Li_2CO_3$ and the dried cathode material precursor were mixed in a molar ratio of 1.07:1.

Table 2 shows the yield of the dried cathode material precursors and the cathode materials of Examples 1-9 and Comparative Examples 1-15 respectively,

TABLE 2

| | Dried cathode material precursor yield (%) | Cathode material yield (%) |
|---|---|---|
| Example 1 | 94.5 | 93.5 |
| Example 2 | 94.1 | 94.3 |
| Example 3 | 93.4 | 94.4 |
| Example 4 | 93.5 | 92.7 |
| Example 5 | 94.4 | 93.4 |
| Example 6 | 96.1 | 95.1 |
| Example 7 | 96.1 | 95.2 |
| Example 8 | 96.3 | 95.6 |
| Example 9 | 95.7 | 94.9 |
| Comparative Example 1 | 83.6 | 82.4 |
| Comparative Example 2 | 81.5 | 82.4 |
| Comparative Example 3 | 82.4 | 85.2 |
| Comparative Example 4 | 82.4 | 83.1 |
| Comparative Example 5 | 81.0 | 83.7 |
| Comparative Example 6 | 80.3 | 84.1 |
| Comparative Example 7 | 82.3 | 83.5 |
| Comparative Example 8 | 81.2 | 81.5 |
| Comparative Example 9 | 76.8 | 78.5 |
| Comparative Example 10 | 80.4 | 80.5 |
| Comparative Example 11 | 81.3 | 80.4 |
| Comparative Example 12 | 80.9 | 79.5 |
| Comparative Example 13 | 75.1 | 74.3 |
| Comparative Example 14 | 80.5 | 79.5 |
| Comparative Example 15 | 80.2 | 79.1 |

Table 3 shows the D50 value and the D90/D10 ratio of the dried cathode material precursors and cathode materials of Examples 1-9 and Comparative Examples 1-15 respectively. The dried cathode material precursors and cathode materials of Examples 1-9 have smaller particle sizes than the dried cathode material precursors and cathode materials of Comparative Examples 1-15. In addition, the dried cathode material precursors and cathode materials of Examples 1-9 show more uniform particle size distributions.

TABLE 3

| | D50 of dried cathode material precursor (μm) | D90/D10 of dried cathode material precursor | D50 of cathode material (μm) | D90/D10 of cathode material |
|---|---|---|---|---|
| Example 1 | 5.6 | 1.5 | 8.5 | 1.6 |
| Example 2 | 4.7 | 1.6 | 8.9 | 1.4 |
| Example 3 | 5.1 | 1.6 | 8.3 | 1.5 |
| Example 4 | 3.8 | 1.8 | 7.5 | 1.7 |
| Example 5 | 4.3 | 1.4 | 7.6 | 1.5 |
| Example 6 | 5.8 | 1.6 | 8.7 | 1.8 |
| Example 7 | 3.5 | 1.5 | 8.5 | 1.6 |
| Example 8 | 5.1 | 1.7 | 8.1 | 1.7 |
| Example 9 | 5.4 | 1.6 | 7.9 | 1.6 |
| Comparative Example 1 | 13.7 | 2.8 | 16.9 | 2.6 |
| Comparative Example 2 | 13.5 | 2.7 | 17.5 | 2.6 |
| Comparative Example 3 | 14.6 | 2.8 | 18.1 | 2.7 |
| Comparative Example 4 | 14.1 | 2.9 | 17.4 | 2.8 |
| Comparative Example 5 | 16.9 | 2.9 | 19.1 | 2.9 |
| Comparative Example 6 | 14.8 | 2.6 | 17.8 | 2.4 |
| Comparative Example 7 | 14.7 | 2.8 | 17.5 | 2.7 |
| Comparative Example 8 | 13.5 | 2.9 | 17.1 | 2.5 |
| Comparative Example 9 | 18.9 | 3.0 | 19.6 | 2.9 |
| Comparative Example 10 | 17.1 | 2.7 | 18.2 | 2.6 |
| Comparative Example 11 | 17.2 | 2.8 | 18.5 | 2.7 |
| Comparative Example 12 | 17.1 | 2.9 | 18.2 | 2.9 |
| Comparative Example 13 | 19.5 | 3.1 | 20.3 | 3.5 |
| Comparative Example 14 | 17.1 | 2.7 | 18.1 | 2.8 |
| Comparative Example 15 | 17.6 | 2.8 | 18.3 | 2.9 |

Table 4 shows the tapped density of the cathode materials of Examples 1-9 and Comparative Examples 1-15. The cathode materials of Examples 1-9 have higher tapped densities than the cathode materials of Comparative Examples 1-15. The higher tapped densities allow one to obtain battery having higher capacity.

TABLE 4

| | Tapped density of cathode material (g/cm³) |
|---|---|
| Example 1 | 2.6 |
| Example 2 | 2.6 |
| Example 3 | 2.7 |
| Example 4 | 2.8 |
| Example 5 | 2.8 |
| Example 6 | 2.6 |
| Example 7 | 2.6 |
| Example 8 | 2.8 |
| Example 9 | 2.8 |
| Comparative Example 1 | 2.3 |
| Comparative Example 2 | 2.1 |
| Comparative Example 3 | 2.2 |
| Comparative Example 4 | 2.3 |
| Comparative Example 5 | 2.1 |
| Comparative Example 6 | 2.1 |
| Comparative Example 7 | 2.1 |
| Comparative Example 8 | 2.2 |
| Comparative Example 9 | 1.9 |
| Comparative Example 10 | 2.0 |
| Comparative Example 11 | 2.0 |
| Comparative Example 12 | 2.1 |
| Comparative Example 13 | 2.0 |
| Comparative Example 14 | 2.1 |
| Comparative Example 15 | 2.0 |

Table 5 shows the flow rate of the suspension discharged from the outlet of the static mixer of Example 9 and Comparative Example 13 over a time period of 24 hours. The flow rate of the suspension discharged from the outlet of the static mixer of Example 9 was almost constant during operation. It was observed that the flow rate of the suspension discharged from the outlet of the static mixer of Comparative Example 13 decreased with time and stopped at the eleventh hour.

TABLE 5

| Time (hour) | Flow rate (L/hour) Example 9 | Flow rate (L/hour) Comparative Example 13 | Time (hour) | Flow rate (L/hour) Example 9 |
|---|---|---|---|---|
| 0 | 20.1 | 20.2 | 13 | 19.8 |
| 1 | 19.6 | 20.0 | 14 | 19.8 |
| 2 | 19.8 | 19.5 | 15 | 19.9 |
| 3 | 20.3 | 18.4 | 16 | 20.2 |
| 4 | 20.2 | 17.5 | 17 | 20.2 |
| 5 | 19.7 | 15.1 | 18 | 19.7 |
| 6 | 19.9 | 12.5 | 19 | 20.0 |
| 7 | 19.9 | 8.5 | 20 | 20.1 |
| 8 | 20.4 | 4.8 | 21 | 19.7 |
| 9 | 20.0 | 1.2 | 22 | 19.8 |
| 10 | 19.9 | 0.1 | 23 | 19.8 |
| 11 | 20.1 | 0 | 24 | 20.0 |
| 12 | 19.6 | / | / | / |

The cyclability performance of the coin cells of Examples 1-9 and Comparative example 1-15 was tested by charging and discharging at a constant current rate of 1 C between 3.0 V and 4.3 V. The cyclability performance of the pouch cells of Example 1-9 and Comparative example 1-15 was tested by charging and discharging at a constant current rate of 1 C between 3.0 V and 4.2 V. Test results of cyclability performance of the coin cells and pouch cells are shown in Table 6 below.

TABLE 6

| | Specific capacity (mAh/g) | Capacity retention of coin cell after 50 cycles (%) | Capacity retention of coin cell after 100 cycles (%) | Cycle life of pouch cell with 80% capacity retention |
|---|---|---|---|---|
| Example 1 | 145.5 | 99.3 | 98.6 | 1,085 |
| Example 2 | 156.2 | 99.2 | 98.2 | 1,060 |
| Example 3 | 168.3 | 99.0 | 98.1 | 1,030 |
| Example 4 | 182.4 | 98.6 | 98.0 | 1,040 |
| Example 5 | 178.2 | 99.0 | 98.2 | 1,040 |
| Example 6 | 225.7 | 98.1 | 98.0 | 850 |
| Example 7 | 183.2 | 98.3 | 98.2 | 1,050 |
| Example 8 | 184.2 | 98.4 | 98.1 | 1,060 |
| Example 9 | 183.2 | 98.4 | 98.2 | 1,030 |
| Comparative Example 1 | 138.4 | 85.7 | 70.2 | 740 |
| Comparative Example 2 | 168.3 | 84.3 | 72.5 | 840 |
| Comparative Example 3 | 168.9 | 83.6 | 72.5 | 860 |
| Comparative Example 4 | 165.7 | 84.7 | 71.5 | 820 |
| Comparative Example 5 | 174.8 | 83.5 | 73.7 | 680 |
| Comparative Example 6 | 200.8 | 83.7 | 71.5 | 420 |
| Comparative Example 7 | 162.8 | 86.2 | 70.3 | 680 |
| Comparative Example 8 | 180.5 | 83.7 | 75.2 | 560 |
| Comparative Example 9 | 133.6 | 85.2 | 72.5 | 760 |
| Comparative Example 10 | 150.3 | 83.7 | 70.5 | 780 |
| Comparative Example 11 | 170.3 | 82.1 | 70.3 | 760 |
| Comparative Example 12 | 171.4 | 82.5 | 72.4 | 680 |
| Comparative Example 13 | 161.7 | 84.0 | 74.5 | 660 |
| Comparative Example 14 | 120.3 | 82.0 | 70.8 | 760 |
| Comparative Example 15 | 130.4 | 83.1 | 71.2 | 750 |

The coin cells and pouch cells of Examples 1-9 showed excellent cyclability. Battery cells prepared by the method disclosed herein show better cyclability than the ones prepared by conventional methods, especially in the case of the NMC622 and NMC811 cathode materials.

The pouch cells of Examples 1-9 and Comparative Examples 1-15 were fully charged with a 0.1 C rate. The volume expansions of the cells at the end of the first and twentieth charging processes at 0.1 C were measured. The results are shown in Table 7 below.

TABLE 7

| | Thickness of pouch cell (mm) | | | Volume expansion (%) | |
|---|---|---|---|---|---|
| Example | Initial | After 1st discharge | After 20th discharge | After 1st discharge | After 20th discharge |
| Example 1 | 3.58 | 3.73 | 3.73 | 4.1 | 4.2 |
| Example 2 | 3.59 | 3.74 | 3.75 | 4.3 | 4.4 |
| Example 3 | 3.57 | 3.74 | 3.74 | 4.9 | 4.9 |
| Example 4 | 3.60 | 3.87 | 3.79 | 5.1 | 5.2 |
| Example 5 | 3.58 | 3.77 | 3.77 | 5.2 | 5.2 |
| Example 6 | 3.59 | 3.78 | 3.78 | 5.3 | 5.4 |
| Example 7 | 3.58 | 3.77 | 3.77 | 5.2 | 5.3 |
| Example 8 | 3.58 | 3.76 | 3.76 | 5.1 | 5.1 |
| Example 9 | 3.59 | 3.78 | 3.78 | 5.2 | 5.3 |
| Comparative Example 1 | 3.58 | 3.82 | 3.83 | 6.8 | 6.9 |
| Comparative Example 2 | 3.58 | 3.86 | 3.86 | 7.8 | 7.8 |
| Comparative Example 3 | 3.58 | 3.84 | 3.84 | 7.2 | 7.3 |
| Comparative Example 4 | 3.59 | 3.87 | 3.87 | 7.9 | 7.9 |
| Comparative Example 5 | 3.58 | 3.84 | 3.84 | 7.3 | 7.4 |
| Comparative Example 6 | 3.58 | 3.86 | 3.86 | 7.9 | 7.9 |
| Comparative Example 7 | 3.57 | 3.83 | 3.83 | 7.3 | 7.3 |
| Comparative Example 8 | 3.59 | 3.89 | 3.89 | 8.5 | 8.5 |
| Comparative Example 9 | 3.59 | 3.82 | 3.82 | 6.3 | 6.4 |
| Comparative Example 10 | 3.58 | 3.84 | 3.84 | 7.2 | 7.3 |
| Comparative Example 11 | 5.58 | 3.86 | 3.86 | 7.9 | 7.9 |
| Comparative Example 12 | 3.59 | 3.86 | 3.86 | 7.4 | 7.5 |

TABLE 7-continued

| Example | Thickness of pouch cell (mm) | | | Volume expansion (%) | |
|---|---|---|---|---|---|
| | Initial | After 1st discharge | After 20th discharge | After 1st discharge | After 20th discharge |
| Comparative Example 13 | 3.58 | 3.86 | 3.86 | 7.9 | 7.9 |
| Comparative Example 14 | 3.58 | 3.84 | 3.84 | 7.2 | 7.3 |
| Comparative Example 15 | 3.59 | 3.86 | 3.86 | 7.4 | 7.5 |

The experimentally measured volume expansions of the cells of Examples 1-9 were much smaller than the values of Comparative Examples 1-15. The volume expansion of the cell of Comparative Example 8 is higher than that of Example 4 because of higher lithium content in the cathode material of Comparative Example 8. The results also show that the cells of Example 1-9 have improved safety performance aver the cells of Comparative Example 1-15.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A method of preparing a cathode material for a lithium-ion battery cell, comprising the steps of:
   dissolving a combination of at least three of a salt of nickel, a salt of manganese, a salt of cobalt, and a salt of aluminium in water to obtain a first solution, wherein a total molar concentration of the metal elements in the first solution is from about 0.1 mol/L to about 3 mol/L;
   dissolving a precipitating agent in water to form a second solution, wherein a concentration of the precipitating agent in the second solution is from about 0.5 mol/L to about 6 mol/L;
   pre-heating the first solution and the second solution to the same temperature from about 30° C. to about 80° C. to obtain a pre-heated first solution and a pre-heated second solution respectively;
   feeding the pre-heated first solution and the pre-heated second solution to a first inlet and a second inlet of a static mixer respectively to obtain a co-precipitating solution;
   filtering a suspension eluted from an outlet of the static mixer to obtain a cathode material precursor, wherein the outlet of the static mixer is coupled to a pH controller for controlling the flow rate of the pre-heated first and second solutions;
   washing the cathode material precursor with water;
   drying the washed cathode material precursor at a temperature from about 60° C. to about 105° C. for a time period from about 4 hours to about 24 hours to obtain a dried cathode material precursor;
   mixing the dried cathode material precursor with one or more lithium salts to obtain a solid mixture, wherein a molar ratio of the metal element lithium of the one or more lithium salts to the total amount of the metal elements selected from a combination of at least three of nickel, manganese, cobalt, and aluminium is from about 1.5:1 to about 1:1, or from about 1.03:1 to about 1:1; and
   calcining the solid mixture in two stages to obtain the cathode material, wherein the first stage is conducted at a temperature from about 350° C. to about 550° C. for a time period from about 2 hours to about 10 hours, and the second stage is conducted at a temperature from about 750° C. to about 950° C. for a time period from about 6 hours to about 15 hours, and wherein the cathode material comprises a lithium multi-metal composite oxide represented by $xLi_2MnO_3\cdot(1-x)LiNi_aMn_bCo_cAl_{(1-a-b-c)}O_2$, wherein $0 \leq a < 1$, $0 \leq b < 1$, $0 \leq c < 1$, $a+b+c \leq 1$, and $0 \leq x < 1$; and the cathode material has a D90/D10 ratio from about 1.4 to about 1.9.

2. The method of claim 1, wherein the cathode material precursor is $[Ni_aMn_bCo_cAl_{(1-a-b-c)}](OH)_2$ or $[Ni_aMn_bCo_cAl_{(1-a-b-c)}]CO_3$, wherein $0 \leq a < 1$, $0 \leq b < 1$, $0 \leq c < 1$, $a+b+c \leq 1$.

3. The method of claim 1, wherein the cathode material precursor is selected from the group consisting of $[Ni_{0.33}Mn_{0.33}Co_{0.33}](OH)_2$, $[Ni_{0.4}Mn_{0.4}Co_{0.2}](OH)_2$, $[Ni_{0.5}Mn_{0.3}Co_{0.2}](OH)_2$, $[Ni_{0.6}Mn_{0.2}Co_{0.2}](OH)_2$, $[Ni_{0.7}Mn_{0.15}Co_{0.15}](OH)_2$, $[Ni_{0.8}Mn_{0.1}Co_{0.1}](OH)_2$, $[Ni_{0.92}Mn_{0.04}Co_{0.04}](OH)_2$, $[Ni_{0.8}Mn_{0.15}Co_{0.05}](OH)_2$, $[Ni_{0.33}Mn_{0.33}Co_{0.33}]CO_3$, $[Ni_{0.4}Mn_{0.4}Co_{0.2}]CO_3$, $[Ni_{0.5}Mn_{0.3}Co_{0.2}]CO_3$, $[Ni_{0.6}Mn_{0.2}Co_{0.2}]CO_3$, $[Ni_{0.7}Mn_{0.15}Co_{0.15}]CO_3$, $[Ni_{0.8}Mn_{0.1}Co_{0.1}]CO_3$, $[Ni_{0.92}Mn_{0.04}Co_{0.04}]CO_3$, and $[Ni_{0.8}Mn_{0.15}Co_{0.05}]CO_3$.

4. The method of claim 1, wherein each of the salt of nickel, the salt of manganese, the salt of cobalt, and the salt of aluminium independently comprise an anion selected from the group consisting of sulfate, nitrate, acetate, chloride, and combinations thereof.

5. The method of claim 1, wherein the salt of the aluminium is sodium aluminate.

6. The method of claim 1, wherein the precipitating agent is selected from the group consisting of sodium hydroxide, potassium hydroxide, calcium hydroxide, ammonium hydroxide, sodium carbonate, potassium carbonate, sodium hydrogencarbonate, potassium hydrogencarbonate, calcium hydrogencarbonate, ammonium carbonate, and combinations thereof.

7. The method of claim 1, wherein the static mixer has a length from about 30 cm to about 100 cm and a diameter from about 5 mm to about 20 cm, and wherein the ratio of the length of the static mixer to the diameter of the static mixer is from about 2:1 to about 20:1.

8. The method of claim 1, wherein the static mixer is made of plastic selected from the group consisting of polypropylene, polytetrafluoroethylene, polyvinyl chloride, copolymers thereof, and combinations thereof.

9. The method of claim 1, wherein the static mixer is coupled to a heating element, and wherein the heating element is a heating jacket surrounding at least a portion of the length of the static mixer.

10. The method of claim 9, wherein the temperature of the heating jacket and the pre-heated first and second solutions are the same.

11. The method of claim 1, wherein the static mixer is sonicated by an ultrasonicator.

12. The method of claim 11, wherein the ultrasonicator is operated at a power from about 60 W to about 600 W.

13. The method of claim 1, wherein the pH value of the co-precipitating solution in the static mixer is maintained at a range from about 8 to about 12.

14. The method of claim 1, wherein the co-precipitating solution is mixed in the static mixer for a time period less than 2 minutes.

15. The method of claim 1, wherein the method does not comprise a step of adding ammonia solution to the pre-heated second solution or the co-precipitating solution.

16. The method of claim 1, wherein the suspension is washed with water for a time period from about 30 minutes to about 2 hours.

17. The method of claim 1, wherein the dried cathode material precursor and the one or more lithium salts are mixed for a time period from about 30 minutes to about 2 hours.

18. The method of claim 1, wherein the dried cathode material precursor has a particle size D50 in the range from about 1 μm to about 12 μm.

19. The method of claim 1, wherein the dried cathode material precursor has a D90/D10 ratio from about 1.3 to about 2.

20. The method of claim 1, wherein the lithium salt is selected from the group consisting of lithium hydroxide, lithium carbonate, lithium fluoride, lithium acetate, lithium oxalate, and combinations thereof.

* * * * *